Feb. 7, 1928.  
W. C. MEYER  
1,658,347  
SOLE FITTING MACHINE  
Filed May 29, 1924  
6 Sheets-Sheet 1
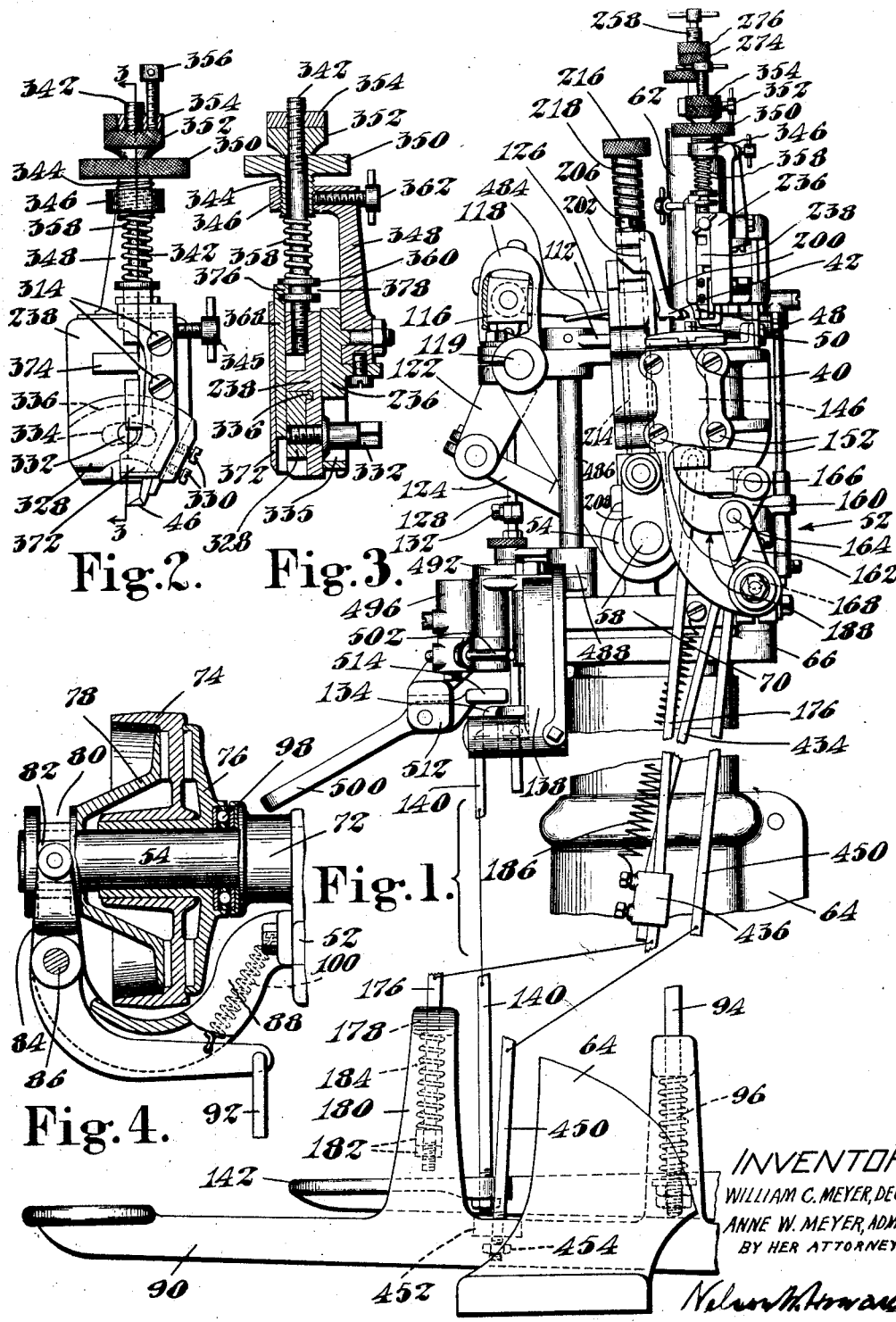
INVENTOR.  
WILLIAM C. MEYER, DEC'D,  
ANNE W. MEYER, ADMX.,  
BY HER ATTORNEY,

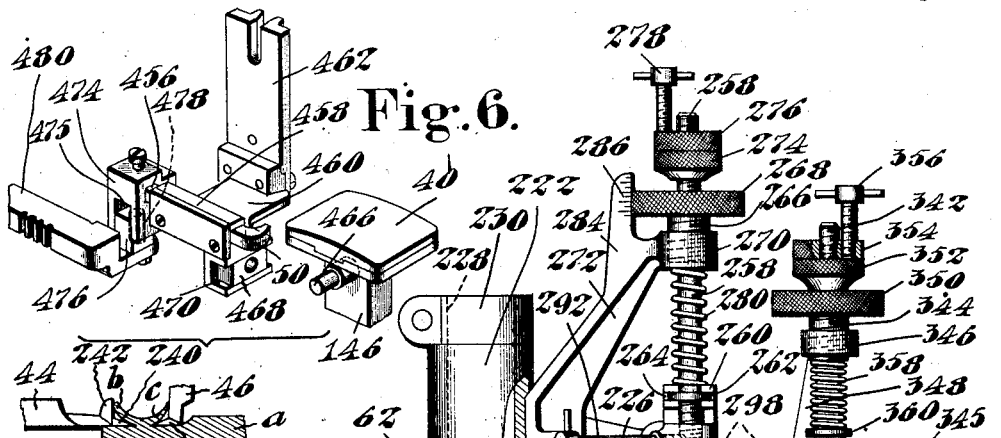
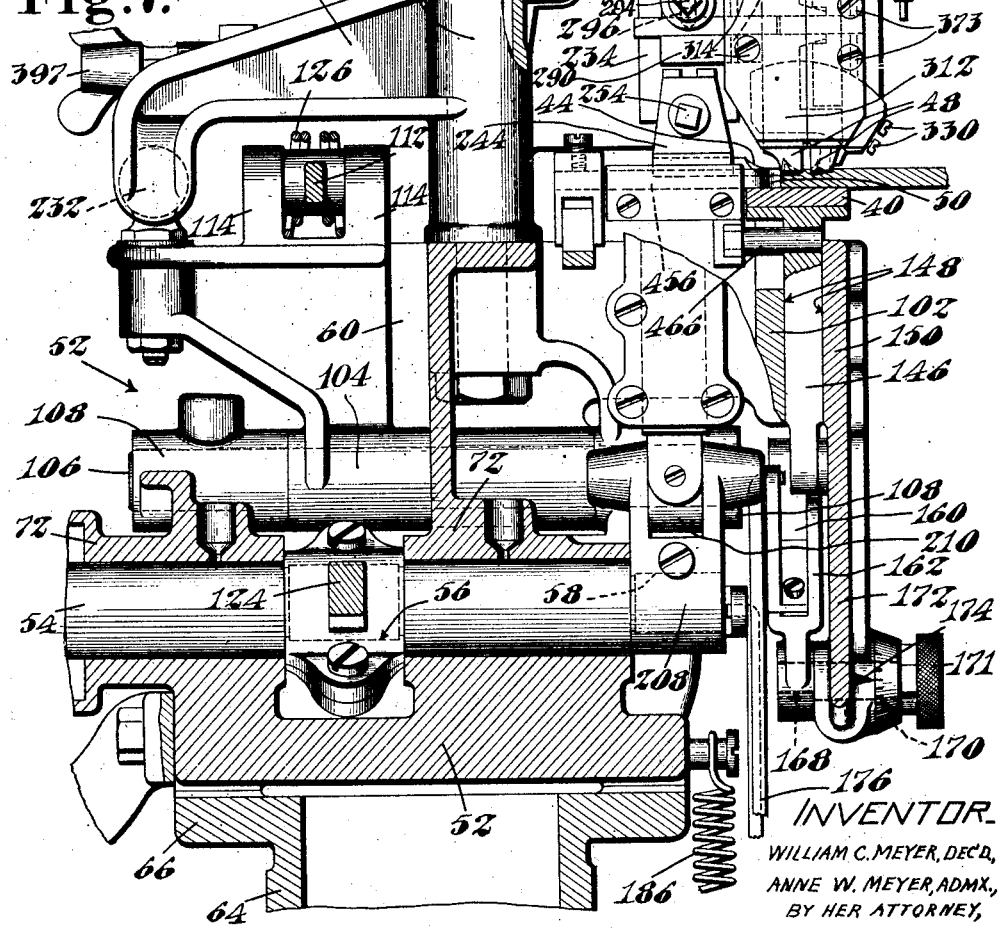

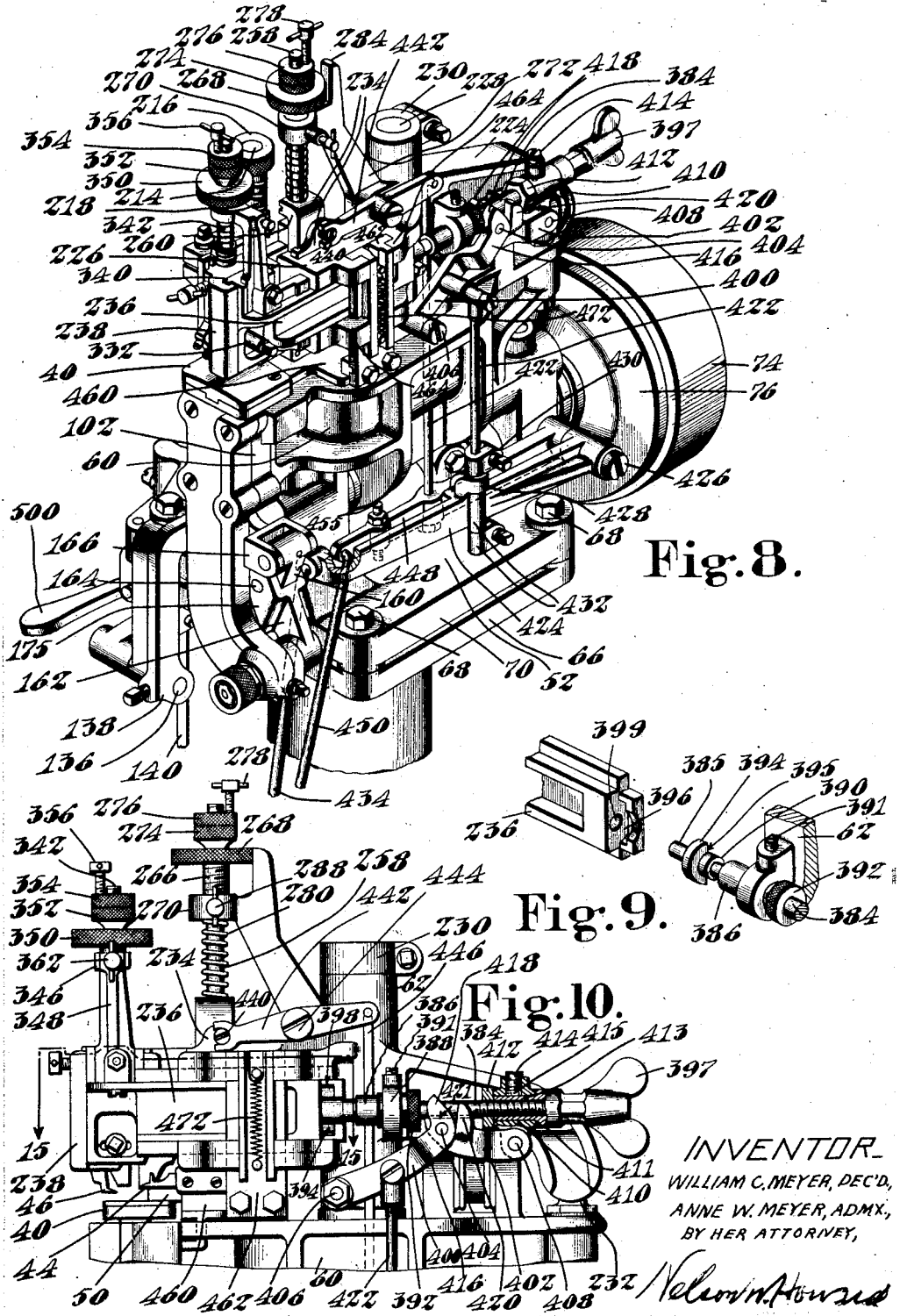

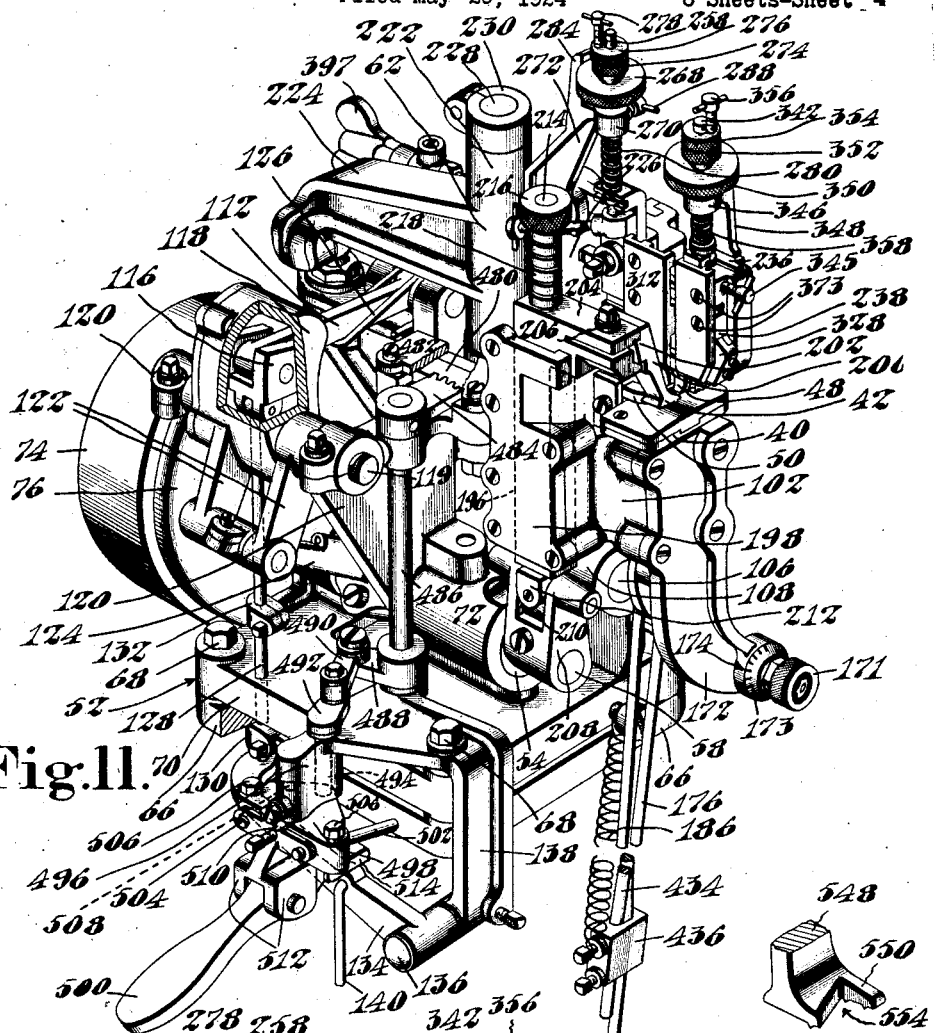
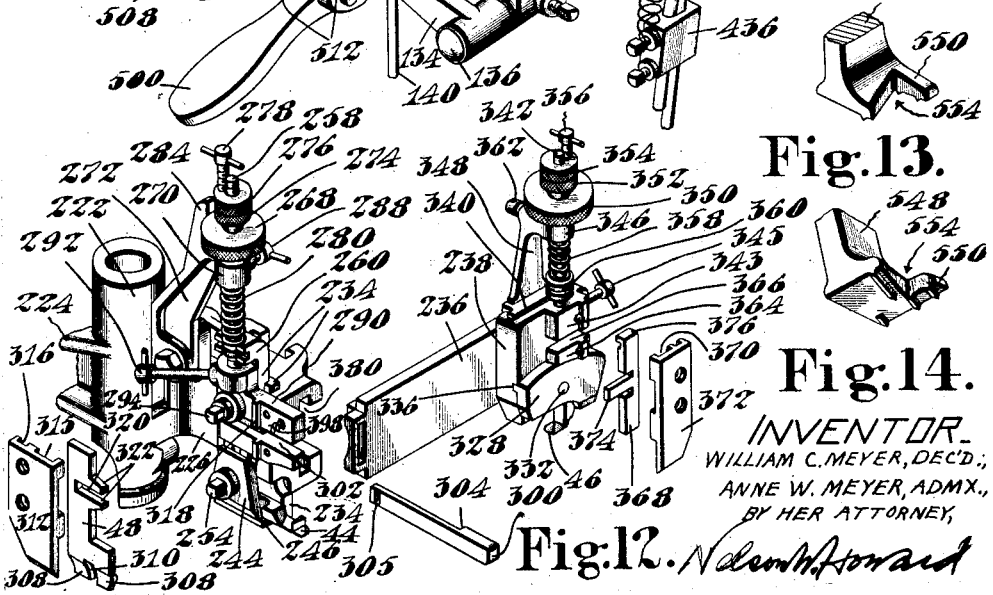

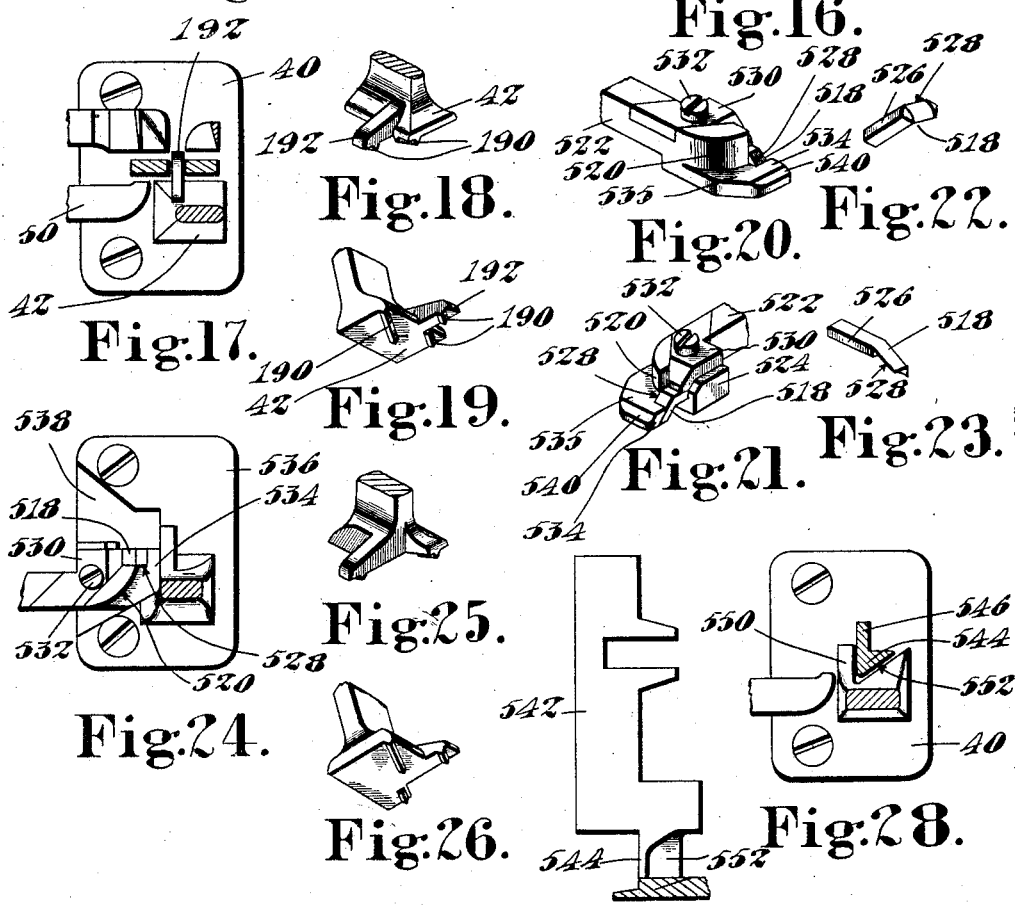

Feb. 7, 1928.  1,658,347
W. C. MEYER
SOLE FITTING MACHINE
Filed May 29, 1924   6 Sheets-Sheet 6
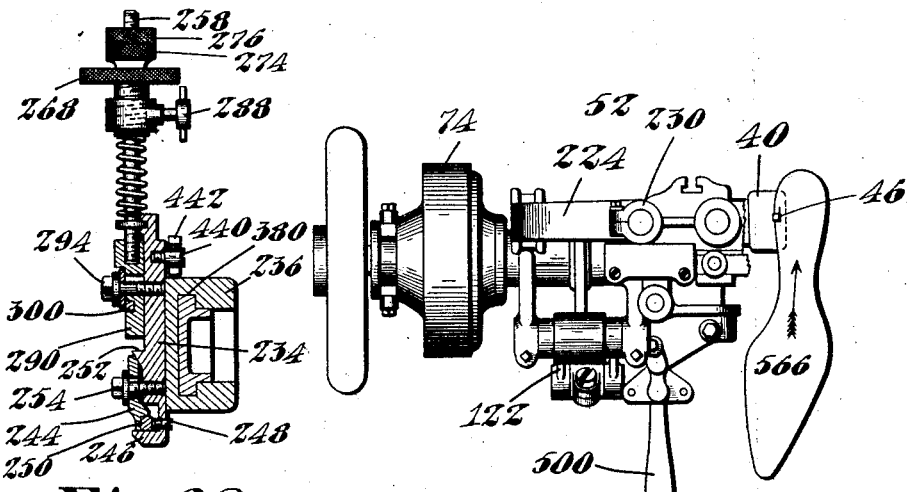
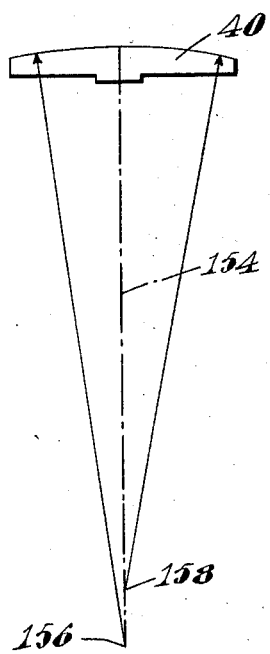
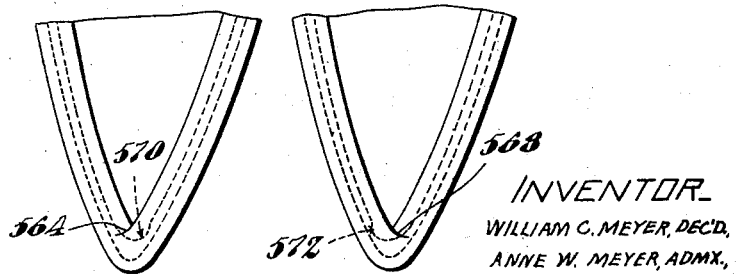
Fig.29.   Fig.32.   Fig.31.   Fig.30.   Fig.33.   Fig.34.
INVENTOR
WILLIAM C. MEYER, DEC'D,
ANNE W. MEYER, ADMX.,
BY HER ATTORNEY,
Nelson W. Howard Patented Feb. 7, 1928.

1,658,347

UNITED STATES PATENT OFFICE.

WILLIAM C. MEYER, DECEASED, LATE OF BEVERLY, MASSACHUSETTS, BY ANNE W. MEYER, ADMINISTRATRIX, OF BEVERLY, MASSACHUSETTS, ASSIGNOR TO UNITED SHOE MACHINERY CORPORATION, OF PATERSON, NEW JERSEY, A CORPORATION OF NEW JERSEY.

SOLE-FITTING MACHINE.

Application filed May 29, 1924. Serial No. 716,679.

This invention relates to improvements in sole fitting machines and is herein illustrated as embodied in a channeling machine for operating upon welt insoles or upon soles for turn shoes.

In two prior Patents, No. 1,623,225 and No. 1,623,226, both granted on April 5, 1927 on applications filed by Harrie A. Ballard, there are disclosed channeling machines in which the work is fed while the cutting means is operating and an additional feed movement is imparted to the work while the cutting means is inoperative to cut the work.

One object of the present invention is to provide an improved and reorganized channeling machine of the general type above referred to.

With this object in view, an important feature of the present invention consists in the combination, in a machine having cutting means movable in a direction to cut the work and thereafter movable to starting position, of work feeding devices relatively movable to grip the work, means for operating said devices to feed the work to the cutting means while the latter is cutting the work, and means for imparting an additional feed movement to the work while said cutting means is returning to starting position. More specifically, and as embodied in the illustrated machine, the work is supported upon a reciprocating work table which is movable forwardly in the direction of feed, and a four-motion feed dog is arranged to engage the upper side of the work and is adapted to co-operate with the work table upon each forward stroke of the latter to grip the work firmly and to feed it positively while it is being cut. The cutting means comprises reciprocating knives which, together with a co-operating presser foot, are moved in a direction opposite to that of the work, the knives cutting the work as the latter advances and the presser foot sliding backwardly over the face of the work as the knives are cutting. Upon the return or non-feeding stroke of the feed dog and the work table, the knives move through a non-cutting stroke in the direction of feed. The feed dog at this time is lifted to release the work and the presser foot moving forwardly is effective in co-operation with the knives to impart an additional feed movement to the work.

To enable the above-described movements effectively to be carried out, the work table and the feed dog are mounted upon an oscillating or swinging carrier while the knives and the presser foot are mounted upon another oscillating or swinging carrier and said carriers are connected to move simultaneously in opposite directions and are actuated continuously from a single eccentric while the machine is in operation. Consequently, the feed movements derived from the two oscillating carriers alternate in period of time, each beginning immediately at the termination of the preceding feed movement and preferably said feed movements are of the same amplitude. As a result of this arrangement, the work is advanced continuously and at a uniform rate of speed through the machine, unless the rate is varied at the will of the operator by means hereinafter to be described. The work table carrier oscillates about a horizontal axis below the table and the upper surface of the table is curved about said axis so that the oscillatory movements of the table will not displace the work from the horizontal line of feed. The carrier for the knives oscillates about a vertical axis so that the knives travel in a horizontal plane.

In operating upon welt insoles, the cuts made by both the channel knife and the edge cutting knife should be of uniform depth throughout the length of the sole margin operated upon irrespective of any variations in the thickness of the sole margin at different portions thereof. It is accordingly desirable in welt work that both knives should be capable of yielding upwardly and that the depth of the cuts produced by each of the knives should be gaged from the upper or flesh side of the insole. In operating upon turn soles, the thickness of the feather produced by the shoulder or edge-cutting knife should be maintained uniform throughout the length of the sole margin irrespective of possible variations in the thickness of the sole. Accordingly the vertical position of the shoulder or edge-cutting knife should not be variable in accordance with variations in the thickness of the sole margin.

Certain features of the invention relate to improvements in the construction of machines of the class herein described to facilitate the conversion of the machines for different classes of work such as changing from a machine fitted for welt work to a machine fitted for turn work, or vice versa. To facilitate conversion of the machine provision is made for adapting the machine for welt work by gaging the edge and channel cuts from the upper or flesh side of the sole under the control of the presser foot, or alternatively for adapting the machine for turn work by gaging the edge cut from the lower or grain side of the sole, or from the work table while gaging the channel cut from the upper or flesh side of the sole. To this end, a feature of the invention comprises certain novel combinations and arrangements of parts including two knife supports or slides capable of relative upward yielding movement, one of said slides carrying an edge knife and the other carrying a channel knife. A presser foot is connected to yield with the channel knife slide and means is provided for connecting the two slides so that they will yield in unison under the control of the presser foot (for welt work) and for disconnecting said slides so that the edge knife will not be controlled by the presser foot, but may be fixed in vertical position (for turn work). The illustrative machine is provided with a vertically movable, upwardly yielding edge knife slide, and a vertically movable, upwardly yielding channel knife slide, and these slides are pressed downwardly by separate springs so that they are capable of yielding independently of each other. The slides are adapted to be connected together to move vertically in unison by means of a horizontally slidable lock bar movable into one position to connect the slides and into another position to disconnect the slides. The machine, as herein shown, is also provided with a single presser foot which is connected to move vertically in unison with the channel knife slide at all times.

To adapt the machine for welt work, an edge slitting knife is employed in conjunction with the channel knife and the slides upon which these knives are mounted are connected together so that both will yield upwardly in unison with the presser foot so that both cuts will be gaged from the upper surface of the flesh side of the sole by means of the presser foot.

To adapt the machine for turn work, a shoulder knife is employed in conjunction with the channel knife. The lock bar is moved to disconnect the slides so that the vertical position of the shoulder knife will not be controlled by the presser foot. The tension of the spring which presses the shoulder knife slide downwardly is increased to fix said knife in vertical position so that it will remain at a predetermined distance above the lower face or grain side of the sole throughout its cutting operation so that the feather will be of unvarying thickness throughout its length.

Heretofore channeling machines have been constructed with the channeling devices disposed at the left side of the machine and adapted to begin the cutting operations at or adjacent to the right-hand margin of the sole, as the sole is viewed by the operator, the sole being held in the left hand of the operator in a substantially horizontal position with the toe directed toward the operator and the heel presented to the channeling devices. The sole is fed away from the operator and the channeling proceeds along the margin of the sole toward the toe. When the toe reaches the knives the operator swings the sole in a counter-clockwise direction (viewing the channeled face of the sole) to cause the knives to cut around the toe, after which the channeling proceeds along the opposite margin of the sole toward the heel, the sole being guided or controlled throughout the operation by the left hand of the operator.

In a machine in which the sole is fed as above described it is very difficult, when operating upon pointed toe soles, to swing the sole so as to enable the knives to cut around the toe without causing the channel knife to overrun or deviate from its proper course more or less before the sole has been completely turned, this overrunning of the channel knife being due to the difference in radii between the curvature at the point of the toe and the curvature of the channel cut. As a result, the knife is liable to cut transversely across the stock which is subsequently to form the channel flap along the margin on the opposite side of the toe from that which has already been channeled.

When a sole in which the channel cut has been overrun at the toe in this manner is thereafter presented to the welt or turn sewing machine the sole will be fed in the same direction as that in which it was fed through the channeling machine, the sole being turned in a counter-clockwise direction to effect the sewing around the toe. Accordingly the channel guide of the welt or turn sewing machine is liable to slip out of the channel through the transverse cut above referred to when the overrun portion of the channel at the toe of the sole is reached This, of course, is undesirable since it results in loss of time and the production of imperfect work.

There is also a further disadvantage resulting from the feeding of a sole through the channeling machine in a direction to require counter-clockwise turning of the sole at the toe. It is well known to operators of channeling machines that in channeling a sole having a pointed toe, the channel knife invariably cuts into the between-substance just before acting upon the point of the toe, thus producing a pocket or recess at the base of the channel, and weakening the between-substance at this point. In a sole fed through the channeling machine in a direction to require counter-clockwise turning of the sole at the toe, the above-mentioned pocket in the between-substance will lie just to the right of the point of the toe, (viewing the channeled face of the sole with the toe pointing toward the observer). Consequently during the subsequent operation of the welt or turn sewing machine, the sole is turned at the toe just after the needle has passed through that portion of the between-substance which has been weakened by the pocket made by the channel knife, and in turning the sole, the sole edge is moved away from the needle so that additional tension is put upon the thread with the result that the between-substance is liable to give way, permitting the stitch to pull out and thus seriously damaging the work.

Since the object of the channeling machine operation is to prepare the sole properly for the subsequent operation of the welt or turn sewing machine, it is clear that the machine of the prior art has to the extent above indicated failed in its purpose. Accordingly, another object of this invention is to produce a machine in which the sole will be so prepared for the subsequent operation of the welt or turn sewing machine that the difficulties above set forth will not be encountered when the sole is being operated upon by the welt or turn sewing machine.

To this end, a further feature of the invention consists in the provision, in a machine for preparing a sole for the subsequent operation of attaching the sole to a shoe in a welt or turn sewing machine, of means for progressively cutting along the margin of a sole, and means for supporting and operating said cutting means, said cutting means and said supporting and operating means being so organized and relatively arranged that the cutting operation in the sole preparing machine proceeds relatively to the sole in the direction of the movement of the sole relatively to the channel guide in the welt or turn sewing machine.

As illustrated, the channeling and work feeding devices are disposd at the right-hand side of the machine and are constructed and arranged to operate upon a sole held in a horizontal plane by the right hand of the operator with the toe directed toward the operator and with the heel end of the sole presented to the channeling knife in such a way that the knives will cut into the material at the left-hand margin of the sole. The sole will then be fed away from the operator and the channeling will proceed along the left-hand margin toward the toe. When the toe reaches the knives, the operator turns or swings the sole in a clockwise direction (viewed from above) to effect the channeling around the toe, after which the channeling proceeds along the margin at the opposite side of the median line toward the heel, the sole being controlled throughout the operation by the right hand of the operator.

When operating by means of the present machine upon a pointed toe sole and when turning the sole in a clockwise direction to effect the cutting around the toe, the channel knife will cut transversely across the channel-flap material at an angle with respect to the median line which is practically the reverse of the angle of the cut produced in machines heretofore employed. Consequently when the sole is being subsequently operated upon in the welt or turn sewing machine and is being turned in a counter-clockwise direction to effect the sewing around the toe, the transverse cut previously made by the channel knife will not afford a path through which the channel guide of the sewing machine may ride out of the channel. On the contrary the transverse cut referred to will be disposed at such an angle to the channel guide of the sewing machine when operating around the toe that there will be no opportunity for the channel guide to leave the channel. As a result the channel guide will remain in the channel and the sewing will proceed uninterruptedly around the toe.

Furthermore, in a sole prepared by means of the present machine, if the between-substance is weakened by the cutting of a pocket therein as above described, the weakened portion will be located at the side of the toe which is not operated upon by the needle until after the sewing has proceeded around the toe. Consequently, while the sole is being swung and the thread is being subjected to increased tension, the stitch will not be liable to pull through because the between-substance has not been weakened at this point.

Other features of the invention relate to provision of improved means for moving the channel knife to and from co-operative relation with the edge knife, to improved means for raising and lowering the feed table, and to the provision of a machine in which vibration of the operative parts is reduced to a minimum.

The invention further consists in features of construction and in combinations and arrangements of parts hereinafter described and claimed, the advantages of which will be apparent to those skilled in the art.

Various features of the invention will be best understood from a description of the invention illustrated in the accompanying drawings.

In the accompanying drawings,

Fig. 1 is a view in side elevation, partially broken away, of a channeling machine embodying the present invention in what is now considered to be its preferred form;

Fig. 2 is a front elevational view of the channel knife slide and associated parts;

Fig. 3 is a sectional view taken along the line 3—3 of Fig. 2;

Fig. 4 is a detail view in central vertical section showing the driving clutch mechanism;

Fig. 5 is a view, partially in front elevation and partially in section, of the head of the machine;

Fig. 6 is a detail perspective view showing particularly the work table, the edge gage and a portion of the means for supporting and adjusting the edge gage;

Fig. 7 is a detail view showing the knives used for channeling a welt insole and illustrating the manner in which they operate upon the work;

Fig. 8 is a perspective view of the head of the machine looking toward the rear of the machine;

Fig. 9 is a detail perspective view of a portion of the mechanism for moving the channel knife horizontally to and from position to operate upon the work;

Fig. 10 is a view in rear elevation of the upper portion of the head of the machine;

Fig. 11 is a perspective view of the head of the machine showing the front and one side thereof;

Fig. 12 is an exploded view showing particularly the knives, the presser foot and members associated therewith, together with a portion of the oscillating carrier upon which these parts are mounted;

Figs. 13 and 14 are detail perspective views of one form of feed dog adapted for use in the illustrated machine;

Fig. 15 is a detail sectional view taken along the line 15—15 of Fig. 10;

Fig. 16 is a detail view, partially in vertical section and partially in front elevation, showing particularly the presser foot and means for connecting the presser foot and channel knife slide to yield upwardly in unison;

Fig. 17 is a detail view, partially in plan and partially in section, of the work table and portions of the edge gage, the presser foot and the work feeding and cutting instrumentalities, showing the operating relation of these parts;

Figs. 18 and 19 are perspective views of the feed dog employed for ordinary welt work;

Figs. 20 and 21 are perspective views of the combined edge gage and chamfer knife device which is interchangeable with the edge gage shown in certain of the preceding figures;

Figs. 22 and 23 are detail perspective views of the chamfer knife shown in Figs. 20 and 21;

Fig. 24 is a view, partially in plan and partially in section, of the combined edge gage and chamfer knife device, showing also a modified form of work table, feed dog and presser foot for use in connection therewith;

Figs. 25 and 26 are perspective views of the feed dog which is employed when the chamfer knife is being used;

Fig. 27 is a detail side elevational view of a modified form of presser foot which is used for turn work, this view showing also a section of a turn sole to illustrate the relation between the presser foot and the sole;

Fig. 28 is a view, partially in plan and partially in section, showing the work table and the edge gage, together with the presser foot and feed dog employed for operating upon turn soles;

Fig. 29 is a detail view in central vertical section showing the edge knife slide and a portion of the carrier upon which it is mounted;

Fig. 30 is a side elevational view of a modified form of work table;

Fig. 31 is a plan view of a channeling machine of a well-known type, this view showing a sole being operated upon and illustrating the manner heretofore generally practised of feeding a sole "left-handed" or in a general counter-clockwise direction while it is being channeled;

Fig. 32 is a plan view of the improved machine herein described, showing the machine operating upon a sole and illustrating the manner in which the sole is fed "right-handed" or in a general clockwise direction while it is being channeled;

Fig. 33 is a detail plan view, on an enlarged scale, of the toe of the sole shown in Fig. 31, illustrating the location of the pocket made by the channel knife in the between-substance at the toe in the operation of a channeling machine in which the sole is turned in a counter-clockwise direction at the toe; and Fig. 34 is a detail plan view, on an enlarged scale, of the toe of the sole shown in Fig. 32, illustrating the location of the pocket made by the channel knife in the between-substance at the toe of a sole in the operation of the machine of the present invention wherein the sole is so fed as to require turning of the sole in a clockwise direction at the toe.

Referring to the drawings, the channeling machine therein shown comprises, in general, a reciprocating work table 40; a four-motion feed dog 42 for co-operating with the work table to grip and feed the work; an edge knife 44 and a channeling knife 46 which are reciprocated in unison in the line of feed and are arranged to cut upon their rearward strokes while the work is being advanced by the feed dog and the work table; a presser foot 48 which reciprocates in unison with the knives, the presser foot sliding freely over the advancing work during the rearward or cutting stroke of the knives and being effective in co-operation with the knives, during the forward on non-cutting stroke of the knives and concurrent rearward movement of the work table and the feed dog to impart an additional feed movement to the work; an edge gage 50 for determing the relation of the work to the knives transversely with respect to the direction of feed; a head 52 upon which the above-named operating parts are mounted; and means including a driving shaft 54 and two eccentrics 56 and 58 formed thereon for imparting the desired movements to the operating parts. For convenience of description the feed movements derived from the feed dog and the work table 40 will hereinafter be termed the "main" or "primary" feeding movements and the feed movements derived from the pressure foot and the knives will be termed the "auxiliary" or "secondary" feeding movements of the work. Certain of the operating instrumentalities of the machine are interchangeable with corresponding parts of somewhat modified construction to adapt the illustrated machine for use either for channeling welt insoles or for channeling soles for turn shoes. When fitted for channeling welt insoles, a chamfer knife may be employed, if desired, for chamfering or beveling the marginal edge at the lower or grain side of the sole for a purpose well known in the art. In Figs. 1, 5, 8, 10 and 11 of the drawings, the present machine has been shown equipped for channeling welt insoles without chamfering the edges thereof.

The work table and the feed dog oscillate in unison in a vertical plane about a horizontal axis below the table and the table and the feed dog co-operate on their forward strokes to grip or clamp the work between them and to impart a primary feed movement to the work. While the work is being fed by the co-action of the feed dog and the work table, the reciprocating knives are moved backwardly, or opposite to the direction of feed, to cut the work and the presser foot slides backwardly over the surface of the work to gage the depth of the cuts made by the knives. The feed dog and the knives move simultaneously in opposite directions and upon the forward or non-cutting stroke of the knives, and the concurrent backward or non-feeding stroke of the feed dog, the presser foot and the knives are effective to impart an auxiliary feed movement to the work, advancing the work along with the knives so that there is no relative movement between the work and the knives during the non-cutting stroke of the knives. By feeding the work in this manner the length of each cut produced will be equal to the distance traveled by the knife in making the cut plus the distance traveled by the work while the cut is being made, and the machine is enabled to make successive cuts the length of each of which is equal to the length of the knife stroke plus the length of the feed stroke.

To obtain the desired reciprocating movements of the above-mentioned feeding and cutting instrumentalities, the work table 40 and the feed dog 42 are mounted upon an oscillating carrier 60 while the knives 44 and 46 and the presser foot 48 are mounted upon a second oscillating carrier 62, and the carriers 60 and 62 are connected to swing concurrently in opposite directions. To this end the carriers 60 and 62 are mounted upon the head 52 and both carriers are operated by the eccentric 56 carried by the driving shaft. The up-and-down movements of the feed dog 42 are derived from the eccentric 58. A hollow pedestal 64 supports the head 52 at a convenient height for convenient presentation of the work to the machine by the operator. The upper end of the pedestal 64 is formed with a horizontal peripheral flange 66 which is secured by means of screws 68 to a base 70 formed on the head 52.

The main shaft 54 is journaled in bearings 72 on the head 52 and is provided at one end with a driving pulley 74 (Fig. 4) which is adapted to be connected by means of a belt (not shown) with any suitable source of power. The pulley 74 is rotatably mounted upon the hub of a clutch member 76 fast upon the driving shaft 54. The pulley 74 is adapted to be connected to drive the shaft 54 through the medium of a friction clutch comprising the above-mentioned member 76 and a second member 78, said clutch members being arranged to co-operate with clutch faces formed at opposite sides of the driving pulley 74. The clutch member 78 is rotatably mounted upon the driving shaft 54 and is also slidable thereon to enable it to co-operate with the clutch member 76 to clutch the pulley 74 to the driving shaft. To this end, the hub of the clutch member 78 is provided with an annular groove 80 in its periphery for receiving blocks 82 carried by the arms of a yoke formed at the upper end of a clutch operating lever 84 which is pivoted at 86 to a bracket 88 secured to the head of the machine. The clutch operating lever 84 is connected with a foot treadle 90 by means including a rod 92 pivoted to the lower end of said lever and a rod 94 having a yielding connection 96 with said treadle, the rods 92 and 94 being arranged respectively outside and inside of the hollow pedestal 64 and being connected together by any suitable means, not shown. One of said rods may be suitably bent or offset to extend through a slot in the pedestal. The foot treadle 90 is suitably mounted in the rear of the lower portion of the pedestal 64 and extends forwardly to a position within convenient reach of the operator. The yielding connection 96 between the treadle rod 94 and the treadle comprises a compression spring of such strength that the driving pulley 74 will be clutched to the shaft 54 at the beginning of the downward movement of the treadle, after which said spring will be compressed to permit further depression of the treadle for a purpose hereinafter to be described. A thrust bearing 98, interposed between the clutch member 76 and the adjacent shaft bearing 72, receives the end thrust of the driving shaft resulting from the action of the clutch operating lever 84 and a spring 100 serves to throw out the clutch when the treadle 90 is released.

The carrier 60 for the work table 40 and the feed dog 42 consists of a casting of the irregular shape best shown in Figs. 5, 8 and 11. A head 102 is formed upon the carrier 60 and is located beneath the work table while the body portion of the carrier extends rearwardly from the head 102 and is formed with a depending sleeve or hub 104, the body portion of the carrier being offset from the axial plane of the hub 104 to avoid interference with various parts of the operating mechanism. The sleeve or hub 104 of the carrier 60 is rigidly secured to a rock shaft 106 which is located above the driving shaft 54 and is parallel thereto. The opposite ends of the rock shaft 106 project beyond the hub 104 and are mounted to turn in bearings 108 in the stationary head 52 of the machine.

The connections between the carrier 60 and the eccentric 56 by means of which the carrier is operated are constructed and arranged to enable the length of stroke of the feed devices to be varied while the machine is running and thus to enable the distance the work is advanced at each feed stroke to be reduced, if desired, while operating along the more abruptly curved portions of the sole margin such, for example, as around the toe so as to facilitate the guiding of the sole at such points. To this end a link 112 is pivotally connected at one end between a pair of ears 114 rising from the carrier 60 and at the opposite end to a block 116 (Fig. 11) which is slidably mounted in a slotted rocker member or crank 118. The crank 118 is pivotally mounted upon a rod 119 the opposite ends of which are secured to a pair of brackets 120 formed on the head 52 of the machine, and a pair of depending arms 122 which are formed integrally with the crank 118 are connected by means of an eccentric rod 124 with the eccentric 56. A torsion spring 126 acting upon the link 112 constantly urges the block 116 upwardly in the slotted crank 118. The block 116 is adapted to be moved downwardly in the crank 118 against the action of the spring 126 by means of a vertical rod 128 which is pivotally connected to the lower side of said block. The rod 128 is slidable through apertures in the base of the head 52 and the flanged top of the pedestal 64 and is provided with an adjustable stop collar 130 which is arranged below the pedestal top and is adapted to co-operate therewith to limit the upward movements of the block 116 relatively to the crank 118 and thus to determine the maximum length of feed stroke. The minimum length of feed stroke is determined by means of an adjustable stop collar 132 on the rod 128 which is arranged to engage the base 70 of the head 52 to limit the downward movement of the block 116 relatively to the crank 118. The collar 132 may be adjusted upon the rod 128 to permit the crank motion to be entirely nullified so that no feed movements will be imparted to the carrier 60. At its lower end the rod 128 is connected with a lever 134 which is pivoted at 136 to a bracket 138 carried by the base of the head 52 and the lever 134 is connected by means of a treadle rod 140 with a foot treadle 142 (Fig. 1). The treadle 142 is arranged beside the treadle 90 and is pivoted at its rear extremity to the lower portion of the pedestal.

The work table 40 is rectangular in plan, as shown in Fig. 6, and is carried by a rectangular slide 146 which is mounted for upward and downward movements in a guideway 148 (Fig. 5) formed in the head 102 of the oscillating carrier 60. The wall of the guideway 148 is formed by a plate 150 which is removably secured to the carrier head 102 by screws 152. The work table is formed with a cylindraceous upper face curved about the axis of oscillation of the table so that as the table oscillates it will have no tendency to displace the work from the horizontal line of feed. The work-supporting face of the table is smoothly finished to lessen the friction between the work and the table upon the backward or non-feeding stroke of the table.

A modified form of work table is shown in Fig. 30. As therein represented the portion of the upper surface of the table which lies rearward of the center line 154, relatively to the direction of feed, is curved about the axis of oscillation 156 of the table. Forwardly in the direction of feed from the center line 154, however, the radius of curvature of the upper surface of the table is slightly shorter than that of the portion rearward of the center line, the center of curvature of the forward portion of the table being indicated at 158. This modified form of work table may advantageously be employed when graded work of uniform thickness and density is being operated upon. In operation, as the table shown in Fig. 30 swings backwardly it supports the work at an increasingly lower level on account of the eccentricity of the forward portion of the upper surface of the table. By making provision for arresting the downward movement of the presser foot shortly after the table starts its rearward movement the modified table above described is enabled to swing clear of the work so that there will be no rubbing friction between the work and the table to oppose the feeding action of the presser foot and the knives. Ungraded work of the usual quality, however, is liable to vary more or less in thickness and density and when operating upon this class of work the presser foot should have a considerable range of downward movement so that when it encounters relatively thin or soft stock it will hold the stock against the work table with the requisite degree of pressure during the cutting strokes of the knives. It will be apparent therefore that under such conditions the work table shown in Fig. 30 would not be capable of swinging clear of the work. It will be understood, however, that when operating upon graded work which does not vary in thickness or density no such range of downward movement of the presser foot is necessary and the means hereinafter to be described for limiting the downward movement of the presser foot may be adjusted with such fineness that the table will clear the work at each backward swinging stroke and thus the feed of the work by the presser foot and the knives will be facilitated.

When the machine is not operating, the table is maintained in a lowered position out of co-operative relation with the feed dog 42 so that the work may readily be positioned upon the feed table beneath the feed dog and beneath the presser foot and the knives. After the work has been placed upon the feed table, the latter is raised into operative position. The edge gage 50 which is associated with the oscillating carrier 62 is connected to move upwardly and downwardly with the feed table 40, as will hereinafter appear, so that the work may be positioned against the edge gage while the table is in lowered position and thus properly located relatively to the knives transversely to the direction of feed before the channeling operation begins. Provision is made for automatically locking the work table in its uppermost position so that it will support the work unyieldingly against the pressure of the presser foot.

The means for raising and lowering the work table and for locking the table in raised position comprises a toggle device consisting of a pair of links 160 and 162 which are connected together by a knuckle pivot 164, the upper link 160 being pivoted within the forked extremity of an arm 166 which is rigid with the work table slide 146 and extends rearwardly from the lower end of said slide, and the lower link 162 being pivoted upon the eccentrically projecting end 168 of a stud 170 carried by a depending extension 172 of the plate 150. The stud 170 is adapted to be turned by means of a knurled head 171 to adjust the position of the eccentric projection 168 and thus to vary the position of the work table relatively to the feed dog when the work table is in its uppermost position. In this way the limit of approach between the feed dog and the work table may be adjusted in accordance with the thickness of the work being operated upon in such a manner that the entire forward stroke of the feed dog will be effective to feed the work. To assist in the adjustment of the work table relatively to the feed dog in accordance with the thickness of the work, a portion of the head of the stud 170 may be graduated in irons as shown at 173 in Fig. 11 for co-operating with a mark 174 on the extension 172 of the plate 150 to indicate the adjustment of the work table. The lower toggle link 162 is formed with a yoke 175 at its upper end to embrace the upper link 160. The upper toggle link 160 is extended forwardly and upwardly beyond the knuckle pivot 164, as best shown in Fig. 1, for connection with the other end of a treadle rod 176, the lower end of which is connected with the treadle 90 already described, the connection being such that after the treadle has been depressed and the work table has been raised into work feeding position, the treadle may be further depressed for a purpose to be explained later. To this end, the treadle rod 176 extends through an apertured ear 178 laterally projecting from a rigid arm 180 carried by the treadle 90. The lower end of the treadle rod 176 is threaded and provided with nuts 182 and a spring 184 encircles the treadle rod between the nuts 182 and the ear 178. The spring 184 is of such strength that normally it will transmit the downward movement of the treadle 90 unyieldingly to the treadle rod 176 until the work table has been raised to its uppermost position, but will yield thereafter to permit further depression of the treadle. A spring 186 fastened at one end to the treadle rod 176 and at the other end to the portion of the head 52 tends to raise the treadle rod 176 to break the toggle 160, 162 to lower the work table when the treadle is released by the operator. When the treadle is depressed to raise the work table, the toggle links are straightened and the portion 188 (Fig. 1) of the upper toggle link 160 engages the connecting portion of the yoke 175 of the lower toggle member to prevent the knuckle pivot 164 from passing beyond dead center. After the toggle has been straightened, it cannot be broken by downward pressure upon the work table and as a result the work table is automatically locked in its raised position and it will unyieldingly resist the downward pressure which is exerted against the work. The toggle will readily be broken, however, by upward movement of the treadle rod 176 caused by the action of the spring 186 upon the release of the treadle 90. The feed dog 42 is provided with a plurality of rib-like teeth 190 (Figs. 18 and 19) formed on its lower face, these teeth being adapted to bite into the work when the latter is gripped between the feed dog and work table to prevent any possible slipping movement between said members and the work and thus insuring a positive feed of the work. The ribs are inclined with respect to the edge gage 50 in such a direction that they have a tendency to hold the work against the edge gage as the work is being fed. A toe 192 projecting rearwardly from the feed dog is arranged to extend the area of engagement of the feed dog with the work along the line of the between-substance.

The feed dog has four motions which comprise a downward stroke to engage the sole, a forward stroke to feed the sole against the cutting knives, an upward stroke to release the sole, and a return stroke preparatory to the next feeding operation. In order that the feed dog shall be moved vertically into and out of gripping engagement with the sole, the feed dog is carried by a slide 196 which is mounted to reciprocate in a vertical guideway formed in the head 102 of the carrier 60. The front of the guideway for the feed dog slide 196 is formed by means of a plate 198 which is removably secured to the carrier head 102. The feed dog is formed with an upwardly inclined shank portion 200 having a dove-tailed tongue 202 which is fitted within a corresponding groove in a lateral projection 204 at the upper end of the feed dog slide 196. This grooved lateral extension 204 is split longitudinally in such a way that it may be contracted by means of a screw 206 so as removably to clamp the feed dog to the slide 196.

The feed dog is lowered yieldingly into engagement with the sole to avoid excessive pressure against the sole and to enable the feed dog to accommodate itself to variations in the thickness of the sole. The upward movement of the feed dog, however, is positive after any yielding pressure to which it may have been subjected has been removed. The vertical movement of the feed dog slide 196 is derived from the eccentric 58 on the forward end of the main shaft 54. The eccentric 58 is connected by means of an eccentric strap 208 with a block 210 which is pivoted between the arms of a yoke 212 carried by a rod 214 (Fig. 1) which extends upwardly through a bore in the feed dog slide 196 and has a threaded portion extending above the slide which is provided with a knurled head 216. In order that the feed dog may be moved downwardly yieldingly, a spring 218 is interposed between the feed dog slide 196 and the knurled head 216. The spring 218 transmits yielding downward movement to the slide 196 under the action of the eccentric 58 so that the feed dog will gage the sole yieldingly. After the feed dog engages the sole, any excess movement derived from the eccentric 58 is taken up by the spring 218. It is desirable that the feed foot shall be held against the sole with a predetermined amount of yielding pressure irrespective of variations in the thickness of the soles in different lots operated upon. This result may be accomplished by turning the head 216 to adjust the compression of the spring 218.

The oscillating carrier 62, upon which the channeling knives are mounted, comprises a hub 222 and two arms 224 and 226 which extend in opposite directions from the hub. The hub 222 of the carrier 62 is mounted to oscillate upon a vertical post 228 which rises from the head 52 on the machine, the lower end of the hub 222 resting upon the head 52 and the upper end of the hub being engaged by a collar 230 which is secured to the post 228 to prevent upward displacement of the carrier 62. The carrier arm 224 is connected by means of a ball-and-socket joint 232 with the carrier 60 for the work table and the feed dog. As a result of this connection, the oscillatory motion of the carrier 60 will be transmitted to the carrier 62, the construction being such that the operating instrumentalities carried by the two carriers 60 and 62 will be moved concurrently through substantially the same length of stroke at each oscillation, but the instrumentalities carried by one oscillating carrier will move in the line of feed in a direction opposite to those on the other oscillating carrier. The arm 226 of the carrier 62 has mounted thereon a vertically movable slide 234 which carries the edge knife 44. There is also mounted in the carrier arm 226 a horizontally slidable support 236 and upon this slidable support is mounted a vertically movable slide 238 which carries the channel knife 46.

The edge knife shown in the drawings is formed with a horizontal blade 240 for slitting the edge of a welt insole to form an outer lip and with a vertical blade 242 for trimming the lip formed by the edge slitting operation to insure that the lip will be of uniform width at all points irrespective of variations in the width of the margin at different parts of the sole caused by changes in the adjustment of the edge gage. The relation of the edge knife to the work is illustrated in Fig. 7 in which a welt insole is shown at $a$ and the outer lip at $b$. The edge knife 44 is adjustably secured to the edge knife slide 234 by means of a clamp plate 244 and to this end the rectangular shank on the edge knife 44 rests upon a horizontal ledge 246 (Fig. 29) formed at the lower extremity of the edge knife slide 234 between the clamp plate 244 and the inner ends of two adjusting screws 248. The lower end of the clamp plate 244 is rabbeted, as indicated at 250, to provide perpendicular shoulders one of which is arranged to engage the front side of the edge knife shank while the other overlies the top of the knife shank to prevent upward displacement thereof. The upper end of the clamp plate 244 bears against the inclined face of a projection 252 upon the edge knife slide 234 and a collar screw 254 extends through an aperture in the clamp plate and is threaded into the knife slide, the collar screw holding the clamp plate against the projection 252 and against the knife shank and thus clamping the knife against the adjusting screws 248. The adjusting screws 248 extend through the knife slide 234 and are arranged in horizontal alinement to engage opposite end portions of the knife shank. By loosening the collar screw 254, the adjusting screws 248 may be turned to adjust the edge knife relatively to the channel knife in the line of feed. In this way the lead of one knife relatively to the other knife may be varied as may be found desirable to facilitate the channeling around toes of different shapes. By manipulation of the adjusting screws 248 and the collar screw 254 the edge knife may also be adjusted to compensate for wear caused by the sharpening of the knife.

The edge knife slide 234 is dove-tailed within a guideway 256 (Fig. 15) in the carrier arm 62 and is supported in the guideway by means of a vertically adjustable rod 258, the lower portion of which is connected with the slide 234 so that it may be turned freely with respect thereto but will cause the slide to move vertically in unison with the rod as the latter is vertically adjusted. To this end the lower portion of the rod 258 extends through a notch formed in an ear 260 which projects forwardly from the upper extremity of the edge knife slide and an integral collar 262 on the rod 258 is rotatably received in a horizontal groove 264 in the ear 260. The upper portion of the rod 258 extends loosely through a bushing 266 which is formed with a knurled head 268 at its upper end. The bushing 266 is threaded within a sleeve 270 carried by a bracket 272 which is rigidly secured to the hub of the carrier 62. Above the knurled head 268 two knurled adjusting nuts 274, 276 are threaded upon the rod 258, the lower nut 274 being adapted to bear against the knurled head 268, and the upper nut 276 carrying a thumb screw 278 which is threaded in an axial direction therethrough and is adapted to be tightened against the lower nut 274 to lock both nuts to the rod 258 so that they will not turn upon the rod but may serve as a means for turning the rod. The nut 274 co-operates with the head 268 to determine the lowermost position which the edge knife may occupy with respect to the work table and to prevent said knife from coming in contact with the table when no work is in the machine. When the edge knife and channel knife slides are connected to adapt the machine for welt work the nut 274 and the head 268 function also in determining the lowermost positions of the channel knife and the presser foot. By unscrewing the thumb screw 278, the lower nut 274 may be turned upon the rod 258 for the purpose of raising or lowering the rod and the parts supported thereby. To apply yielding pressure to the edge knife slide, a coiled spring 280 encircles the rod 258 between the lower end of the bushing 266 and the upper end of the edge knife slide 260. The compression of the spring 280 may be adjusted, to vary the pressure upon the work, by turning the bushing 266 by means of its knurled head 268. Under certain conditions of adjustment of the operating parts mounted upon the carrier 62, the knives may be adjusted vertically with respect to the work table by turning the knurled head 268, as will hereinafter be more fully explained. A finger 284 on the bracket 272 extends upwardly beside the knurled periphery of the head 268 and is graduated in irons, shown at 286, the graduations being adapted to co-operate with the upper or lower face of the head 268 to assist in adjusting the knives relatively to the work table in accordance with the thickness of the work to be operated upon. A thumb screw 288, Figs. 8, 10 and 12, is provided in the sleeve 270 to lock the bushing 266 in adjusted position. The adjusting rod 258 extends downwardly beyond the integral collar 264, the downwardly projecting end of the rod being threaded into a bore in an adjusting block 290. The rod is adapted to be locked against turning relatively to the adjusting block 290 by means of a thumb screw 292. The block 290 is adjustable vertically with respect to the edge knife slide, but is adapted to be rigidly secured to the slide by means of a collar screw 294, the latter extending loosely through a vertical slot 296 (Fig. 5) in the adjusting block 290, and being threaded into the edge knife slide. The adjusting block 290 has a vertical tongue-and-groove connection 298 (Fig. 5) with the edge knife slide which prevents edgewise twisting movement of the block relatively to the slide.

The adjusting block 290 carries a horizontally slidable lock-bar 300 which may be positioned to connect the edge knife slide for vertical adjustment and upward yielding movement in unison with the channel knife slide. The block 290 also supports the presser foot 48. As best shown in Fig. 12, the lock-bar 300 is rectangular in cross-section and located in a rectangular groove 302 which extends horizontally across the front face of the adjusting block 290. The lock-bar 300 is adapted to be held rigidly within the groove 302 by the clamping action of the collar screw 294, the collar portion of which overlies the lock-bar. The thickness of the main portion of the lock-bar is the same as the depth of the groove 302 so that the front face of the lock-bar is flush with the front face of the block 290. The right-hand end of the lock-bar projects beyond the block 290 and is thickened at its rear side to provide a stop shoulder 304 for engagement with the adjacent edge of the block 290. A thumb-nail slot 305 in the lock-bar affords a convenient means for sliding it from one position to another. By loosening the collar screw 294 and sliding the lock-bar toward the left until the stop shoulder 304 engages the block 290, the lock-bar will be disengaged from the channel knife slide 238 and the latter will be free for upward yielding movement, as well as vertical adjustment, independently of the edge knife slide. When the edge knife slide is thus disconnected from the channel knife slide the edge knife is no longer controlled by the presser foot, and the spring 280 (the tension of which will ordinarily be increased) will function to hold the edge knife at a predetermined fixed distance above the lower face or grain side of the sole so that the feather will be of uniform thickness irrespective of variations in the thickness of the sole at different portions thereof.

The presser foot 48, as best shown in Fig. 12, is provided with two downwardly extending toe portions 308 which are arranged to engage the portions of the work which are to form the channel flaps near the vertical plane of the knives so as to co-operate with the knives to feed the work by gripping engagement with the channel flap material on the forward strokes of the presser foot. The toe portions 308 of the presser foot are separated by a vertical notch 310 which is adapted to receive the toe 192 of the feed dog 42 to enable the latter to engage the work at a point rearward of the presser foot. The shank of the presser foot is in the form of a flat plate and is received in a vertical guideway formed between the front face of the adjusting block 290 and a cap plate 312 which is secured by means of screws 314 to the block 290. As shown, the shank of the presser foot is adapted to lie within a vertical channel 315 formed in the cap plate 312. A groove 316 extends parallel to the channel 314 to receive a vertical rib 318 on the block 290, this construction holding the cap plate rigidly so as to prevent edgewise twisting displacement of the presser foot. The shank of the presser foot is horizontally notched at 320 to receive means hereinafter to be described for connecting the presser foot to yield vertically in unison with the channel knife slide. The length of the notch 320 is extended by means of lateral projections 322 upon the shank of the presser foot. It is to be noted that while the presser foot is mounted in the cap plate 312 associated with the edge knife slide, the presser foot is at all times connected for vertical movement in unison with the channel knife slide and may or may not be connected to move vertically with the edge knife slide according to whether or not the edge knife slide and the channel knife slide are connected by the lock-bar 300.

The channel knife 46 which is carried by the channel knife slide 238 is formed with a cutting edge 326 for cutting a channel in the work so as to form an inner lip such as that shown at c in Fig. 7. The channel knife is mounted for angular adjustment about a point coincident with the inner end of its cutting edge in order that the angle of the channel cut may be varied without affecting the width of the between-substance, or the depth of the channel. To this end, the shank of the channel knife 46 is received within a groove in a knife block 328 (Figs. 2 and 3) and is rigidly but adjustably secured therein by means of screws 330. The knife block 328 is secured to the channel knife slide 238 by means of a collar screw 332 the shank of which extends forwardly through an arcuate slot 334 of the channel knife slide and is threaded into the knife block. The head of the collar screw 332 projects through an aperture 335 in the slidable support 236, said aperture permitting vertical adjustment of the slide 238 relatively to said support. An arcuate tongue-and-groove connection 336 between the knife block and the channel knife slide permits radial adjustment of the knife about a center in the end of its cutting edge by loosening the collar screw 332. By loosening the screws 330 the channel knife may be removed for sharpening and replaced without disturbing its angular adjustment. The knife may be readily adjusted within its groove in the knife block to compensate for wear. The channel knife slide is mounted for vertical sliding movement relatively to the horizontally slidable knife slide support 236 by means of a dove-tailed tongue-and-groove connection, best shown at 340 in Figs. 8, 12 and 15, the groove being formed in the rear face of the knife slide and the tongue being formed on the support 236. The knife slide 238 is supported by means of a vertical adjusting rod 342, the lower extremity of which is threaded into the upper portion of the knife slide, said slide being thickened at its front side to form a projecting lug 343 which is tapped to receive the threaded end of the rod. The rod 342 is adapted to be locked against turning relatively to the channel knife block 328 by means of a thumb screw 345. Above the knife slide the rod 342 extends upwardly through a bushing 344 (Fig. 5) which is threaded within a collar 346 formed on the bracket 348 rigidly secured to the slidable support 236. The bushing 344 is provided with a knurled head 350 and the rod 342 projects upwardly beyond the head 350 and is threaded to receive two nuts 352, 354, the lower nut 352 being arranged to bear against the knurled head 350, and the upper nut 354 carrying a thumb screw 356 which may be tightened against the lower nut 352 to lock the nuts 352 and 354 rigidly to the rod 342 so that they may be employed as a means for turning the rod 342. The nut 352 co-operates with the head 350 to determine the lowermost position which the channel knife and the presser foot may occupy with relation to the work table when said parts are disconnected from the edge knife to adapt the machine for turn work. By loosening the thumb screw 356, the lower nut 352 may be turned upon the rod 342 to raise or lower the channel knife slide and parts connected therewith. Pressure is applied to the channel knife slide by means of a coiled spring 358 which surrounds the rod 342 and is adapted to be compressed between the bushing 344 and a collar 360 which is integral with the rod 342. The bushing 344 may be turned by means of its knurled head 350 to adjust the compression of the spring 358, and a thumb screw 362 (Fig. 12) in the bracket 348 may be tightened to lock the bushing against turning.

The channel knife slide 238 is adapted to be connected with the edge knife slide 234 by means of the lock-bar 300. To provide means for interengaging with the lock-bar 300, a lug 364 is formed on the front face of the channel knife slide between the knife block 328 and the lug 343, the lugs 364 and 343 being spaced apart to provide between them a rectangular groove 366 for receiving one end of the lock-bar. The slot 366 is so located in the channel knife slide that when the lock-bar is positioned in the edge knife slide, with the stop-shoulder 304 of the lock-bar in engagement with the adjacent edge of the edge knife slide, the lock-bar will not extend into the slot in the channel knife slide, and thus the edge knife and channel knife slides will be disconnected. By sliding the lock-bar to the right it may be projected into the slot 366, in which position it functions to lock the channel knife slide to the edge knife slide to adapt the machine for welt work.

In order that the channel knife slide and the presser foot 48 may be connected to yield upwardly in unison as hereinbefore mentioned, a presser foot connecting member 368 is also carried by the channel knife slide, this member being adapted for vertical adjustment relatively to said slide to enable the channel knife and the presser foot to be adjusted vertically relatively to each other for the purpose of varying the depth of the channel cut. To this end the presser foot connecting member 368 is made in the form of a flat plate and is received in a vertical guideway 370 formed in the inner face of a cap plate 372 which is secured by screws 373 to the front of the channel knife slide. The front faces of the knife block 328 and of the lugs 343 and 364 lie in the same vertical plane and cooperate with the walls of the guideway 370 to support the presser foot connecting member 368 for vertical sliding adjustment. A horizontal tongue 374 on the presser foot connecting member 368 is adapted to be received in the notch 320 of the presser foot 48 to connect the presser foot and said member for sliding adjustment in unison. The tongue 374 extends a sufficient distance into the notch 320 to permit relative horizontal movement of the edge knife and channel knife slides for a purpose to be explained hereinafter. Vertical relative adjustment of the presser foot and the channel knife is effected by raising or lowering the adjusting rod 342. To accomplish this result the rod 342 and the presser foot connecting member are connected by a lateral tongue 376 (see also Figs. 2 and 3) on the member 368 which extends into an annular groove 378 formed in the periphery of the collar 360. This construction permits the rod 342 to turn freely with respect to the member 368 but transmits the up-and-down movement of the rod to the member.

The support 236 for the channel knife slide 238 is slidably mounted in a horizontal dove-tailed guideway 380 in the arm 226 of the oscillating carrier 62, and the support 236 is adapted to be moved in the guideway 380 to shift the channel knife horizontally relatively to the edge knife toward and from position to operate upon the work. To this end the slidable support 236 is operatively connected with the foot treadle 90 and the arrangement is such that when the treadle is in normal or raised position the channel knife will be retracted from operative relation with the edge knife, and when the treadle is depressed to raise the work table the channel knife will be moved horizontally toward the edge knife until it is located in position to operate upon the work. In order that the required horizontal movements of the channel knife may be derived from the foot treadle 90, the connections between the treadle and the channel knife slide support include a horizontal operating bolt 384 which is supported by a bearing sleeve 386 within which the bolt is both slidable and rotatable. The bearing sleeve 386 is externally threaded and is screwed into an apertured ear 388 projecting rearwardly from the hub of the carrier 62. The forward end of the sleeve 386 acts as a stop co-operating with an annular shoulder 390 on the operating bolt 384 to limit the movement of the bolt in one direction to gage the operative position of the channel knife relatively to the edge knife and thus to determine the width of the between-substance. The bearing sleeve 386 is provided with a knurled head 392 by which it may be turned to adjust the operative relation of the channel knife to the edge knife for the purpose of varying the width of the between-substance. A set screw 391 serves to lock the sleeve 386 in adjusted position.

To permit the channel knife slide to be removed from the machine, the operating bolt 384 is detachably connected with the channel knife slide support 236 by means of interengaging wing-and-socket devices on the bolt 384 and support 236 respectively. As shown in Figs. 9 and 10, the wing 394 projects at right angles to the axis of the bolt 384 and is in the form of a half disk, the straight edge face 395 of which is disposed in a plane intersecting the axis of the bolt. The wing 394 is adapted to interlock with the walls of a recess 396 in the rear of the slidable support 236, the arrangement being such that when the straight edge face 395 of the wing member 394 is vertically disposed and the bolt 384 is turned so that the wing member is located within the recess 396, the support 236 is operatively connected with the bolt 384. A stem 385 projecting axially beyond the wing 394 is received in a socket 399 in the knife slide support 236. By giving the bolt 384 a half turn, the wing member 394 may be positioned radially as shown in Fig. 9, in which position it is disengaged from the recess 396 so that the slidable support 236 and the parts carried thereby may be removed from the carrier 62. A winged knob 397 threaded upon the rear extremity of the bolt 384 enables the bolt to be turned to engage the wing member 394 with the recess 396 or to disengage said member from said recess as above described. When the channel knife slide support 236 is removed from the carrier 62 the presser foot connecting member 368 is disengaged from the presser foot 48 and in order that the presser foot shall be supported in its guideway at this time a small coiled spring 398 (Fig. 12) is seated in a recess in block 290 and bears against the rear face of the presser foot. By means of the spring 398, the presser foot is fractionally held in place so that when the channel knife slide support is replaced the tongue 374 of the member 368 will register with the notch 320 in the presser foot.

The bolt 384 is adapted to be moved lengthwise in the bearing sleeve 386 to move the channel knife to or from operative position by means of a toggle device comprising links 400 and 402 which are connected together by a knuckle pivot 404. The toggle link 400 is pivoted at 406 to the hub of the carrier 62 and the link 402 is pivoted at 408 to a depending portion of a collar 410 on the bolt 384. To prevent axial relative movement of the bolt 384 and the collar 410 while permitting the bolt to turn within the collar, the collar is confined between an annular shoulder 411 on the knob 397 and a nut 412 on the bolt. As shown in Fig. 10, a sleeve 413 extends from the knob 397, beyond the shoulder 411 and through the collar 410 and the nut 412 bears against the outer end of this sleeve. A screw 414 in the collar 410 presses a friction washer 415 against the bolt 384 to hold the bolt in any position into which it may be turned, thus preventing accidental disengagement of the bolt from the channel knife slide support 236. The forward end of the toggle link 402 is embraced by a yoke 416 formed at the adjacent end of the link 400 and the arms of the yoke 416 are offset upwardly to form toes 418 arranged to co-operate with stop lugs 420 carried by the link 402 to prevent the knuckle pivot 404 from passing beyond dead center when the toggle is straightened. A shoulder 421 on the toggle link 402 is arranged to engage with the lower side of the bolt 384 to limit the upward movement of the toggle links. The toggle link 400 is connected by a vertical rod 422 with a lever 424 (Fig. 8) which is pivoted at one end upon a stud 426 at the rear of the head 52. The rod 422 extends through an apertured ear 428 on the lever 424 and the ear 428 is located between collars 430 and 432 which are rigidly but adjustably secured to the rod 422. The forward extremity of the lever 424 is connected by means of a rod 434 with a block 436 which is adjustably secured to the treadle rod 176. The spring 186, which holds the treadle 90 in raised position, may conveniently be secured to the block 436 and will serve to maintain the toggle links normally in the position shown in Figs. 8 and 10, in which position the spring 186 will hold the channel knife in a normal or idle position offset from its working position transversely with respect to the direction of work feed. Upon depression of the treadle 90 the toggle links 400, 402 will be straightened so that the channel knife will be moved horizontally inward toward the edge knife in a plane parallel to the face of the work while the work table is being raised into work supporting position. When the toggle comprising the links 400, 402 has been straightened, the channel knife will be locked in operative position and can be unlocked only by an upward movement of the rod 422 upon the release of the treadle 90. When the sleeve 386 is turned to effect a variation in the width of the between-substance, a corresponding adjustment of the collar 410 upon the bolt 384 should be made so as to insure that the bolt-operating toggle will straighten to lock the channel knife in operative position. This adjustment of the collar 410 is effected by loosening the nut 412 and turning the knob 397 in the appropriate direction, after which the nut 412 should again be tightened.

When operating upon turn work, it is sometimes desirable that the edge cutting or shoulder knife be retracted from cutting position when working around the heel end of the sole, although the cut made by the channel knife is to continue round the heel. In welt work also it may be desirable to raise both the channel knife and the edge knife to terminate the channeling and edge slitting operations by cutting upwardly through the lips or flaps formed by the knives. To enable these results to be accomplished means is provided whereby at any time during the cutting operation the operator may cause the edge knife slide to be raised so that if the edge knife slide is disconnected from the channel knife slide the edge or shoulder knife only will be raised from the work, but if the edge knife and channel knife slides are connected together by the lock-bar 300, both knives will be elevated above cutting position. As best shown in Figs. 8 and 10, a stud 440 projects rearwardly from the upper portion of the edge knife slide 234 and is received in the forked end of a lever 442 which is pivoted at 444 to the carrier 62. The opposite end of the lever 442 is connected by means of a rod 446 with a lever 448 which is pivoted on the stud 426 and lies closely beside the lever 424. The forward extremity of the lever 448 is connected by a rod 450 (see also Fig. 1) with the foot treadle 90. The lower end of the rod 450 extends loosely through an ear 452 formed at one side of the treadle 90 and is threaded to receive an adjustable abutment 454 which is normally spaced beneath the ear 452 to provide lost motion between the abutment and the ear. The abutment 454 is so adjusted upon the rod 450 that the treadle 90 may be depressed to raise the work table into work supporting position and operatively to position the channel knife before actuating the rod 450 to raise the edge knife slide, but after the work table and the channel knife have been operatively positioned, further depression of the treadle 90 will be effective to raise the edge knife slide or both the edge and channel knife slides as the case may be. An adjustable screw 455 carried by the lever 448 is adapted to engage the base 70 to determine the distance to which the knife or knives will be raised above the work.

The edge gage 50 is adapted to reciprocate in unison with the channel and edge knives and to move up and down in unison with the work table. The edge gage is also adjustable transversely of the direction of feed to vary the width of the margin or feather at different parts of the sole. As shown in Fig. 6, the edge gage is formed at the forward end of a rectangular bar 456 which is horizontally disposed and is mounted for longitudinal sliding movement at right angles to the direction of feed. The forward portion at the right-hand end of the slide bar 456 overlies the work table in close proximity to the upper face thereof and terminates in a work-engaging end face the forward corner of which is rounded to meet the oncoming work. The edge gage bar 456 is mounted for longitudinal sliding movement in a horizontal guideway 458 formed in a carrier 460 which is rigidly secured to the lower end of a slide 462 which is mounted for vertical movement in the arm 226 of the oscillating carrier 62. As shown at 464 in Fig. 8, portions of the carrier arm 226 project rearwardly above and below the channel knife slide support 236 and these projecting portions are provided with dovetailed grooves in which is received the vertical edge gage slide 462. The edge gage 50 is connected to move vertically in unison with the work table 40 by means of a pin 466 which projects horizontally from the work table slide 146 and carries a block 468 which is pivotally mounted thereon and which is slidable in a horizontal guideway 470 formed in a depending portion of the edge gage carrier 460. The block 468 is free to slide horizontally in a guideway 470, thus permitting the edge gage slide 462 to reciprocate with the carrier 62, while the pin 466 transmits the upward and downward movement of the work table to the edge gage. To prevent cramping of the edge gage slide 462 in its guideways in the carrier arm 226, a spring 472 is secured at its lower end to the slide 462 and at its upper end to the arm 226. When the work table and the edge gage are in lowered position, the spring 472 is under tension and when the treadle 90 is depressed to raise the work table, upward movement is transmitted to the edge gage carrier 460 at a point vertically offset from the slide 462 and at this time the tension of the spring 472 is effective to prevent cramping of the slide 462. The spring 186 being considerably stronger than the spring 472, the latter spring will not interfere with the movements of the work table, the channel knife and the edge gage to inoperative positions.

To provide for adjustment of the edge gage transversely of the direction of work feed, the rear of the edge gage bar 456 is rigidly secured to a block 474 (Fig. 6) having a groove 475 in which a block 476 is adapted to slide vertically as the edge gage rises or falls. The block 476 is swivelled upon a vertical stud 478 carried by the forward end of a rack-bar 480. The arrangement of the above-described interengaging parts is such that the block 476 and the edge gage 50 are free to move vertically relatively to the rack-bar 480 and also horizontally in parallelism with the direction of feed, but are constrained to move transversely of the direction of feed in unison with the rack-bar. It will be seen that the above-described manner of mounting the edge gage and connecting it with the rack-bar 480 enables the gage to oscillate in unison with the knives without having any movement relatively to the knives and consequently there will be no undesired variation in the width of the sole margin or feather.

The rack-bar 480 is slidable within a stationary guideway 482 (Fig. 11) in the frame 52 and the teeth of the rack-bar are engaged by the teeth of a gear segment 484 fast upon the upper end of a vertical rock-shaft 486 which is mounted to turn in suitable bearings fixed to the head 52. An arm 488 secured to the lower end of the rock-shaft 486 is connected, by means of a link 490, with an arm 492 which is fast on the upper end of a short vertical rock-shaft 494, the latter being journaled in a bearing 496 carried by a portion of the bracket 138. Below the bearing 496 the shaft 494 has rigidly secured thereto a block 498 carrying a handle 500 which is conveniently located at the front of the machine and is adapted to be manipulated to effect the required adjustment of the edge gage. The handle 500 is adapted to be rocked back and forth in a horizontal plane, movement of the handle toward the right being effective to retract the edge gage to increase the width of the sole or feather and movement of the handle toward the left being effective to advance the edge gage to decrease the width of the feather. The maximum width of feather is determined by a stop pin 502 carried by the block 498 and arranged to engage the flanged top of the pedestal 64. The minimum width of feather is determined by means of a pin 504 also carried by the block 498 and arranged to engage the flange top of the pedestal 64. The pins 502 and 504 extend horizontal through the block 498 and are rigidly but adjustably secured in the block by means of clamping bolts 506. By loosening the bolts 506 and adjusting the pins 502 and 504 lengthwise in the block 498, the adjustments for minimum and maximum width of feather may be varied. It is desirable to provide for three different widths of feather and to this end provision is made for positioning the edge gage at a point intermediate the extreme positions of adjustment thereof. To this end, the bearing 496 is extended forwardly and carries a spring-pressed plunger 508 which is forced downwardly against the upper face of the block 498 and is adapted to engage within a V-shaped notch 510 in said block frictionally to hold the block in the intermediate position of adjustment in which it is shown in Fig. 11. It will be seen that the handle 500 is pivotally mounted for vertical rocking movement between the arms of a yoke depending from the block 498, and that the handle is extended rearwardly beyond its pivotal axis to provide an arm 514 which overlies the lever 134. The arrangement is such that by rocking the handle 500 upwardly the lever 134 will be depressed to shift the block 116 downwardly in the slotted crank 118 for the purpose of shortening the feed stroke. Upon the release of the handle 500, the block 116 will be moved upwardly in the crank 118 to restore the normal length of feed stroke. Thus the operator may use either the foot treadle 142 or the handle 500 for changing the length of feed.

For a purpose well known in the art, it is sometimes desirable to chamfer or bevel the sole edge adjacent to the unchanneled face of the sole. To provide means for performing this operation, a chamfer knife is provided, the knife being carried by an edge gage of modified construction which is adapted to be substituted for the edge gage hereinbefore described. The chamfer knife and the modified form of edge gage are shown in Figs. 20 to 24, inclusive, in which figures the chamfer knife is indicated at 518 and the edge gage at 520. The work engaging face of the edge gage is shaped as in the form already described, and is located at the end of a rectangular bar 522 which is adapted to be secured to the block 474 to adapt the edge gage for longitudinal adjustment by manipulation of the handle 500. The bar 522 is formed with a portion 524 which is laterally offset toward the rear of the machine and the upper face of which is recessed to receive the shank 526 of the chamfer knife 518. The shank 526 extends at an angle to the portion of the knife which is ground to form the cutting edge 528 and is horizontally disposed in the recessed portion of the edge gage bar 522. The chamfer knife is rigidly held in place in the recessed portion of the edge gage bar 522 by means of a clamp plate 530 which is detachably secured to the bar 522 by means of a screw 532. The cutting edge 528 is inclined at an angle of 45° to the surface of the work table and is located in such relation to the edge gage and work table as properly to perform its beveling operation. The cutting edge of the chamfer knife necessarily extends somewhat below the surface of the work table and the free extremity of the knife is located beneath a lateral projection 534 on a ledge 535 which constitutes an extension of the bar 522 below the plane of the work-engaging portion of the edge gage. A special form of work table 536 (Fig. 24) is employed in connection with the chamfer knife, the table 536 having a recess 538 in its upper surface for receiving the ledge 535. The upper face of the ledge 535 is flush with the surface of the table and functions to support the sole clear to the edge at the point which is being chamfered. The recess 538 is sufficiently wide in the direction of feed to allow for the reciprocating movement of the table. The extreme end of the ledge 535 is beveled as shown at 540 and occupies an undercut extension of the recess 538 when the edge gage is adjusted for minimum width of sole margin. A modified form of feed dog is provided for use in connection with the chamfer knife, this form of feed dog being shown in Figs. 25 and 26 and differing from the form hereinbefore described principally in that the portion extending to the left of the rearwardly extending toe has been cut away sufficiently to avoid interference with the chamfer knife.

In operating upon turn work, a shoulder knife is employed to form a marginal shoulder and a feather, as is well known in the art. Inasmuch as the shoulder knife cuts away the sole stock outside of the marginal shoulder and above the feather, the presser foot employed for turn work should be adapted to engage the sole only along a path which does not overlap the line of the shoulder cut. To this end, there is provided for turn work a modified form of presser foot such as that shown at 542 in Fig. 27, this form having only a single toe portion 544, and said toe portion being constructed and arranged to engage the sole only above that portion of the stock which is to form the between-substance and the inner lip. The cross-sectional shape of the toe 544 of the presser foot 542 is shown in Fig. 28 wherein it will be seen that the toe 544 has a rearwardly projecting portion 546 adapted to engage the surface of the sole along the line of the between-substance. This form of presser foot is particularly adapted for use in connection with soles having pointed toes. As is well known to those skilled in the art, a presser foot which engages the portion of the sole immediately adjacent to the edge is liable to run off the sole at the toe while the sole is being swung (if the toe is pointed) and after the sole has been swung a presser foot of this type will not readily run back again on to the sole. With a presser foot such as that shown in Fig. 27, however, the work is engaged only at a distance from the sole edge and there is no tendency for the presser foot to run off the sole at the toe. It has been found, however, that if the soles to be operated upon do not have pointed toes, it may often be advisable to use the presser foot shown in Figs. 18 and 19. The use of this form of presser foot is particularly desirable if stock of inferior quality is being used since this foot will overlie the extreme edge portion of the sole and prevent it from buckling as the sole is pressed against the edge gage and thus insure uniformity in the width of the sole margin.

A modified form of feed dog is provided for use in connection with the presser foot 542 for turn work. This form of feed dog is shown at 548 in Figs. 13 and 14. The feed dog 548 is provided with a rearwardly extending toe 550 which is arranged to engage the work in advance of the knives along the surface of the stock which is to be removed by the shoulder and edge cutting knife. The toe 544 of the presser foot 542 is beveled as shown at 552, and the feed dog 548 is formed with a V-shaped recess 554 which permits the feed dog and presser foot to assume the relative positions shown in Fig. 28 when the feed dog is at the limit of its feeding stroke.

To adapt the machine for ordinary welt work, it should be fitted, as shown in Figs. 1 to 12, with an edge-slitting knife, a channel knife, and with the form of feed dog shown in Figs. 18 and 19, and the edge knife and channel knife slides should be connected together by the lock-bar 300. The lock-bar is rendered freely slidable either to connect or disconnect the edge knife and channel knife slides by loosening the collar screw 294. The springs 280 and 358 should be under relatively light tension and if any adjustment of the spring tension is required, this may be accomplished by turning the nuts 274 and 352 on the rods 258 and 342, respectively, after having first loosened the thumb screws 278 and 356. Assuming that the work table has been properly adjusted vertically with respect to the feed dog in accordance with the thickness and density of the work to be operated upon, as hereinbefore described, the presser foot and the knives should then be adjusted to position the presser foot the proper distance above the work table and to position the edge and channel knives relatively to the presser foot to locate the cutting edges of the knives below the bottom of the presser foot a distance equal to the thickness of outer lip and depth of channel desired. This adjustement may be effected by manipulation of the adjusting rods 258 and 342. The rod 258 may be turned by means of the nuts 274 and 276 after the nuts have been locked to the rod by tightening the thumb screw 278 and after the thumb screw 292 and the collar screw 294 have been loosened. In a similar manner the rod 342 may be turned by means of the nuts 352 and 354, said nuts having first been locked to the rod by the tightening of the thumb screw 356, and the thumb screw 345 having been loosened to permit turning of the rod relatively to the channel knife slide. After the knives and the presser foot have been relatively adjusted, it may be necessary to adjust the presser foot and the knives in unison relatively to the work table. This may be effected by loosening the thumb screw 362 and turning the knurled head 350 to raise or lower the edge knife and channel knife slides, together with the parts carried thereby. If it is desired to chamfer the edges of the soles, the edge gage 50 must be replaced by the modified form of edge gage 520 which carries the chamfer knife 518.

In changing from welt work to turn work, the channel knife slide support 236 is withdrawn from the guideway 380 to remove the channel knife slide from the machine and thus to facilitate the adjustment of the parts carried by the edge knife slide. The lock-bar 300 is moved toward the left so that the channel knife slide will not be connected with the edge knife slide when the channel knife slide is later replaced in the machine. A shoulder knife is used in place of the edge-slitting knife and the feed dog 548 is employed. If the soles to be operated upon have pointed toes the presser foot 542 should be used. If the toes are not pointed it may be desirable to employ the presser foot 48 and thus to insure that the extreme edge portion of the sole will be firmly held against the work table while the shoulder knife is cutting. The spring 280, associated with the edge knife slide, should be put under comparatively heavy tension by turning the knurled head 268 after having loosened the thumb screw 288. The nut 274, having first been unlocked from the rod 258, may be turned to adjust the shoulder knife and the presser foot toward or from the work table, after which the nuts 274 and 276 may be locked to the rod 258 and the rod turned thereby to adjust the shoulder knife relatively to the work table in accordance with the thickness of feather desired. The channel knife slide may then be replaced and the rod 352 turned to adjust the channel knife relatively to the presser foot to gage the depth of the channel cut. If a thicker or thinner feather is subsequently desired, the shoulder knife may be readjusted relatively to the work table by turning the knurled head 268, the operator being guided in such readjustment by the relation of the head to the graduations 286.

When the machine is idle, the work table is in lowered position and the channel knife is in retracted position, having been moved horizontally away from the edge knife and transversely with respect to the direction of work feed. A sole may then readily be placed upon the work table in contact with the edge gage and properly positioned relatively to the knives for the beginning of the channeling operation. The treadle 90 is then depressed to raise the work table, to move the channel knife horizontally toward the edge knife into operative position, and to throw the clutch to start the machine. As the work starts to feed, the knives will immediately bury themselves in the work, and if the machine is fitted for welt work, the depth of cuts produced by both knives will be determined by the adjustment of the presser foot. The feeding and cutting of the sole takes place as hereinbefore described, the mechanism for varying the speed of the work feed and the width of the sole margin of feather being manipulated as may be desired. At the completion of the cutting of a sole, the treadle 90 may be released to lower the work table, retract the channel knife from operative relation with the edge knife, and to disengage the members of the clutch to stop the machine. The lowering of the work table and retracting of the channel knife will cause the sole to be stripped from the knives so that it may be readily removed from the machine. In welt work it is sometimes desirable to stop the channeling operation in the vicinity of the heel breast line at the side of the sole opposite to that where the cutting commenced and to have the knives cut upwardly through the lips at the end of the channel. This result may be accomplished by depressing the treadle 90 beyond the point necessary to start the operation of the machine. In turn work, the shoulder knife may be raised independently of the channel knife, to prevent the shoulder cut from being continued around the heel of the sole, by depressing the foot treadle 90.

Fig. 31 illustrates conventionally a channeling machine in which the work is fed "left-handed" in accordance with the custom heretofore generally practised. This machine is so organized that the operating instrumentalities are located at the left side of the head 560 of the machine and the sole 562 is guided by the left hand of the operator and is fed toward the rear of the machine or away from the operator. Inasmuch as the sole is guided as it is fed so as to enable the cutting means to operate progressively along the sole margin it may be said that the sole is fed in a general counter-clockwise direction. At any rate the sole must be turned or swung in a counter-clockwise direction in order to effect the cutting around the toe of the sole. It is well known to those skilled in the art that when operating upon pointed toe soles the channel knife will overrun or cut transversely across the channel flap material at the toe so as to produce a slit such as that shown at 564 in Fig. 33. It is also well known that in the subsequent operation of attaching together the sole and the upper, the channel guide of the welt or turn sewing machine is liable to slip out of the channel in the sole, through the transverse slit 564 above referred to, when said slit reaches the channel guide during the turning of the sole at the toe.

The present machine is so organized that its operating instrumentalities are located at the right side of the head 52 and the sole, indicated at 566 in Fig. 32, is guided by the right hand of the operator and is fed toward the rear of the machine or away from the operator. Under these conditions it may be said that the sole is fed in a general clockwise direction. At any rate it is evident that the sole must be turned in a clockwise direction to enable the knives to cut around the toe. If the sole has a pointed toe, as shown in Fig. 32, the channel knife will overrun at the toe, cutting transversely across the channel flap stock and producing the slit 568, (Fig. 34). On account of the fact that the sole 566 is turned in a clockwise direction, instead of in a counter-clockwise direction, as in the case of the sole 562, the slit 568 in the sole 566 will extend from the left side of the toe toward the right (viewing the sole as in Fig. 32), instead of from the right side of the sole toward the left (as in the sole shown in Fig. 31). In the subsequent sewing operation performed in the welt or turn sewing machine, the sole 566 will be turned in a general counter-clockwise direction as it is fed and as a result there will be no tendency for the channel guide to run out of the channel through the slit 568 at the toe.

It is also well known to operators of channeling machines that in turning a sole having a pointed toe, the channel knife invariably cuts into the between-substance just before reaching the point of the toe, thus producing a recess or pocket at the base of the channel and weakening the between-substance at this point. In a sole fed left-handed through a channeling machine, this pocket in the between-substance will lie just to the right of the point of the toe, viewing the channeled face of the sole of the toe pointing toward the observer as in Fig. 33, in which figure the pocket is indicated at 570. During the subsequent operation upon the sole in the welt or turn sewing machine, the sole is turned just after the needle has passed through the portion of the between-substance which has been weakened by the pocket 570, and in turning the sole, the sole edge is moved away from the needle and increased tension is put upon the thread with the result that the weakened between-substance is liable to give way, permitting the stitch to pull out and thus seriously injuring the shoe.

By feeding the sole "right-handed" or in a general clockwise direction through the channeling machine, as is done in the present machine, the pocket cut by the channel knife in the between-substance at the toe will be located (as shown at 572 in Fig. 34) just at the left of the tip of the toe, (viewing the sole as in Fig. 32). When this sole is fed "left-handed", or in a general counter-clockwise direction, through the welt or turn sewing machine, the sole will be turned before the pocket 572 has been reached by the needle and the between-substance, being unweakened at this point, will withstand the increased tension put upon the thread so that the stitch will not pull through and the shoe will not be damaged. This practically eliminates the pulling-through of the stitch when turning the shoe to sew around the toe of the sole in the welt or turn sewing machine.

While the particulars of construction herein set forth are well adapted to one mechanical form of the invention, the invention is not limited to these details of construction, nor to the conjoint use of all its features, nor is it to be understood that these particulars are essential, since they may be variously modified and are within the skill of the artisan without departing from the scope of the invention characteristic features of which are set forth in the appended claims.

Having described the invention, what I claim as new and desire to secure by Letters Patent of the United States of America is:—

1. In a machine of the class described, cutting means movable in a direction to cut the work and thereafter movable to starting position, feed devices relatively movable to grip the work; means for operating said devices to feed the work while said cutting means is cutting the work, and other means for imparting an additional feed movement to the work while said cutting means is returning to starting position.

2. In a machine of the class described, cutting means movable in a direction to cut the work and thereafter movable to starting position, devices arranged to engage opposite sides of the work and positively operated to feed the work while said cutting means is cutting the work, and other means for feeding the work while said cutting means is returning to starting position.

3. In a machine of the class described, intermittently operative cutting means movable in a direction to cut the work and thereafter movable to starting position, devices relatively movable toward each other periodically to grip the work and co-acting to feed the work while gripping it and while said cutting means is cutting the work, and means for feeding the work while said cutting means is returning to starting position.

4. In a machine of the class described, a reciprocating knife movable in one direction to cut the work and in the opposite direction to return to starting position, feed devices relatively movable to grip the work, means for operating said devices to feed the work while said knife is cutting the work, and another feed device for feeding the work while said knife is returning to starting position.

5. In a machine of the class described, devices relatively movable to grip the work and positively operated to feed the work intermittently, and means movable opposite to the direction of feed to cut the work and to gage the depth of the cut from the cut face of the work while said devices are feeding the work and movable in the direction of feed to impart an additional feed movement to the work while said devices are inoperative to feed the work.

6. In a machine of the class described, oscillating feed devices intermittently operative to feed the work, an oscillating knife movable opposite to the direction of feed to cut the work whilt said feed devices are feeding the work, and means for feeding the work while said knife is returning to starting position.

7. In a machine of the class described, oscillating means intermittently operative to feed the work, a knife movable opposite to the direction of feed to cut the work while the work is being fed by said means and movable to starting position while said means is inoperative to feed the work, and other oscillating means for feeding the work while the knife is returning to starting position.

8. In a machine of the class described, devices relatively movable toward and from each other to grip and release the work, means for operating said devices to feed the work while it is gripped thereby, cutting means movable opposite to the direction of feed to cut the work while it is being fed by said devices and movable to starting position while the work is released by said devices, and means for imparting an additional feed movement to the work during the movement of the cutting means to starting position.

9. In a machine of the class described, devices reciprocating in unison and operative at each reciprocation to grip and release the work and to feed the work while it is gripped, cutting means movable opposite to the direction of feed to cut the work while it is being fed by said devices and movable to starting position while the work is released by said devices, and means for imparting an additional feed movement to the work during the movement of the cutting means to starting position.

10. In a machine of the class described, reciprocating feed devices arranged to engage opposite sides of the work and co-operating intermittently to clamp the work between them and to feed the work, cutting means movable opposite to the direction of feed to cut the work while said devices are co-operating to clamp and feed the work and movable to starting position while said devices are in non-co-operative relation, and means for feeding the work during the movement of the cutting means to starting position.

11. In a machine of the class described, reciprocating devices co-operating periodically to clamp the work by engagement with opposite sides thereof and to feed the work while it is clamped, a knife reciprocating in the line of feed and operating to cut the work on its backward stroke, means for imparting a backward stroke to the knife during the forward stroke of the feed devices and a forward stroke to the knife during the backward stroke of the feed devices, and means independent of said reciprocating devices for feeding the work during the backward strokes of the feed device.

12. In a machine of the class described, devices reciprocating at opposite sides of the work and co-operating intermittently to clamp the work between them and to feed the work while it is clamped thereby, a knife reciprocating in the line of feed and effective upon its backward stroke to cut the work, and means for operating the feed devices and the knife simultaneously in opposite directions during the cutting operation.

13. In a machine of the class described, reciprocating devices co-operating intermittently to clamp the work by engagement with opposite sides thereof and to feed the work, a knife reciprocating in the line of feed and operating to cut the work on its backward stroke, and means for imparting a backward stroke only to the knife during the forward stroke of the feeding device.

14. In a machine of the class described, positively operated feed devices engaging the opposite sides of the work and adapted to feed the work intermittently, reciprocating means for cutting the work while it is being fed by said devices, and means co-operating with said cutting means for feeding the work during the non-feeding movements of said devices.

15. In a machine of the class described, reciprocating devices arranged to engage opposite sides of the work, means for operating said devices to impart intermittent feed movements to the work, a knife for cutting the work while it is being feed by said devices, and a presser foot for gaging the depth of cut in the work and for advancing the work between said intermittent feed movements.

16. In a machine of the class described, two oscillating carriers connected to swing simultaneously in opposite directions, mechanism for operating said carriers, means on one of said carriers effective during the movement of the latter in one direction to feed the work, a knife on the other carrier for cutting the work while the work is being fed by said means, and means on the knife carrier effective during the forward stroke of the knife to impart an auxiliary feed movement to the work.

17. In a machine of the class described, a reciprocating work table, means co-operating with the table to feed the work during movement of the table in one direction, a reciprocating knife movable opposite to the direction of feed to cut the work while the work is being fed, and a presser member movable with the knife and effective upon its movement in the direction of feed to impart a supplemental feed movement to the work.

18. In a machine of the class described, a carrier mounted to oscillate about a horizontal axis, means on said carrier for imparting a feed movement to the work during the oscillation of the carrier in one direction, a second carrier mounted to oscillate about a vertical axis, a knife on the second carrier for cutting the work, and means for operating said carriers simultaneously in opposite directions.

19. In a machine of the class described, a normally depressed work table, an oscillating carrier for said table, a feed dog for engaging the upper face of the work and co-operating with the table upon the movement of said carrier in one direction to feed the work, and means for elevating said table into co-operative feeding relation to said feed dog.

20. In a machine of the class described, a work table, an oscillating carrier therefor, a feed dog for engaging the upper face of the work and co-operating with the table upon the movement of said carrier in one direction to feed the work, means for elevating said table into co-operative feeding relation to said feed dog, and means for lowering the table to stop the feed of the work.

21. In a machine of the class described, a four-motion feed dog, a knife, a vertically movable work table located beneath said feed dog and knife, an oscillating carrier upon which said feed dog and table are mounted, and means for raising the work table to bring the work into position to be acted upon by the feed dog and the knife and for lowering the table to stop the feed of the work and facilitate its removal from the machine.

22. In a machine of the class described, two oscillating carriers connected to move simultaneously in opposite directions, means on one of said carriers for alternately cutting and feeding the work, and means on the other carrier for supporting the work and feeding it while it is being cut.

23. In a machine of the class described, two oscillating carriers connected to move simultaneously in opposite directions, means on one of said carriers intermittently operative to feed the work, means on the other carrier for cutting the work while it is being fed by said feeding means, and means on said last-mentioned carrier for feeding the work while said feeding means is inoperative to feed the work.

24. In a machine of the class described, two oscillating carriers, a work table and a feed dog mounted upon one of said carriers and arranged to co-operate to feed the work, a knife mounted upon the other carrier for cutting the work as it is being fed, a driven eccentric, and connections between said eccentric and said carriers for moving the latter simultaneously in opposite directions.

25. In a machine of the class described, two oscillating carriers connected to move simultaneously in opposite directions, mechanism for operating said carriers, a work table and a feed dog mounted upon one of said carriers and arranged co-operatively to engage the work at opposite sides thereof to impart intermittent feed movements thereto, knives on the other carrier for cutting the work while it is being advanced by the feed dog and the work table, and a presser foot on the last-mentioned carrier for gaging the cuts made by said knives and for advancing the work between the feed movements imparted thereto by said feed dog and table.

26. In a machine of the class described, two reciprocatory carriers connected to move simultaneously in opposite directions, a knife on one of said carriers, a feed dog on the other of said carriers, an actuator connected with one of said carriers, and means for varying the length of stroke imparted to said carriers by said actuator.

27. In a machine of the class described, two reciprocatory carriers connected to move simultaneously in opposite directions, a knife on one of said carriers, a feed dog on the other of said carriers, a crank connected to operate one of said carriers, and means operable while the machine is running for varying the effective length of said crank to vary the length of stroke of each of said carriers.

28. In a machine of the class described, cutting means, means for feeding the work, means for varying the speed of work feed, an edge gage, means for adjusting the edge gage in the plane of the work transversely with respect to the direction of feed, and single means under the control of the operator for effecting either of said adjustments.

29. In a machine of the class described, cutting means, means for feeding the work, means for varying the speed of work feed, an edge gage, means for adjusting the edge gage in the plane of the work transversely with respect to the direction of feed, and single means under the control of the operator for effecting said adjustments simultaneously.

30. In a machine of the class described, cutting means, means for feeding the work, means for varying the speed of work feed, an edge gage, means for adjusting the edge gage in the plane of the work transversely with respect to the direction of feed, a hand lever for effecting either of said adjustments, and a foot treadle for operating the means for varying the speed of work feed independently of said hand lever.

31. In a machine of the class described, a work support, a work feeding device mounted to oscillate in a vertical plane about a horizontal axis below the work support, a cutting device mounted to oscillate in a horizontal plane, a constantly driven member, operator-controlled connections from said member and one of said devices for varying the amplitude of the oscillations of said device, and connections between said devices for transmitting oscillatory movement from one to the other.

32. In a machine of the class described, means for supporting and feeding a sole, a channel knife normally offset from its working position transversely with respect to the direction of feed of the sole movable into working position in a plane parallel to the face of the sole, and means for imparting said movements to said knife.

33. In a machine of the class described, means for supporting and feeding the work, an edge slitting knife, a channel knife movable toward the edge knife into position to operate upon the work and away from the edge knife to withdraw the channel knife from the channel, means to move said channel knife toward and from the edge knife, and adjustable means for limiting the approach of the channel knife toward the edge knife to predetermine the thickness of the between-substance.

34. In a machine of the class described, means for supporting and feeding the work, an edge slitting knife and a channel knife movable relatively to one another transversely with respect to the direction of work feed, and means for effecting a predetermined amount of relative movement between said knives relatively to position the knives to operate upon the work.

35. In a machine of the class described, means for supporting and feeding the work, an edge knife, a channel knife, and means including a toggle for moving the channel knife toward the edge knife into position to operate upon the work and for locking the channel knife in said position.

36. In a machine of the class described, means for supporting and feeding the work, an edge knife, a channnel knife movable toward and from the edge knife transversely with respect to the direction of feed, a toggle device associated with the channel knife, and means for operating the toggle device to move the channel knife toward the edge knife into position to operate upon the work and away from the edge knife into inoperative position, said toggle device being arranged to lock the channel knife in position to operate upon the work.

37. In a machine of the class described, means for supporting and feeding the work, an edge gage, a channel knife movable toward the edge gage into position to operate upon the work and away from the edge gage into inoperative position, and means including a toggle adapted when straightened to lock said knife in operative position relatively to said edge gage, means for straightening the toggle to move said knife into operative position and lock it therein, and a spring for breaking the toggle to unlock said knife and retract it from operative position.

38. In a machine of the class described, a work supporting table capable of being raised and lowered, means effective to feed a sole resting on said table when said table is in raised position, an edge knife, a channel knife movable in a path parallel to the face of the sole and transversely of the direction of feed into and out of operative position, and means for simultaneously raising said support and moving the channel knife into operative position.

39. In a machine of the class described, a work support capable of being raised and lowered, means effective to feed the work when said support is in raised position, an edge knife, a channel knife movable in the plane of the work and transversely of the direction of feed into and out of operative position, and means including a treadle adapted upon depression of the treadle to raise said support and move the channel knife into operative position and upon release of the treadle to lower said support and retract the channel knife from operative position.

40. In a machine of the class described, means for supporting and feeding the work, a channel knife, a horizontally slidable support upon which said knife is mounted, means including a rotatable bolt for moving said support to move said knife into position to operate upon the work or to retract the knife from said position, said bolt and said support being connected by interengaging fastening elements adapted to be disengaged by a partial rotation of said bolt to permit removal of said support and knife from the machine.

41. In a machine of the class described, an edge knife, a channel knife, vertically movable upwardly yielding slides upon which said knives are severally mounted, a horizontally slidable support for the channel knife slide movable in one direction operatively to position the channel knife relatively to the edge knife and in the opposite direction to withdraw the channel knife from operative position, and an oscillating carrier in which the edge knife slide and said slidable support are mounted.

42. In a machine of the class described, an edge slitting knife, a channel knife, vertically movable upwardly yielding slides upon which said knives are severally mounted, a horizontally slidable support for the channel knife slide, and means for imparting a predetermined amount of sliding movement to said support operatively to position the channel knife relatively to the edge knife.

43. In a machine of the class described, an edge knife, a channel knife, vertically movable upwardly yielding slides upon which said knives are severally mounted, a horizontally slidable support for the channel knife slide, and means for moving said slidable support in one direction operatively to position the channel knife relatively to the edge knife, and in the opposite direction to withdraw the channel knife from operative position.

44. In a machine of the class described, two vertically movable upwardly yielding slides, an edge knife carried by one of said slides, a channel knife carried by the other of said slides, and a horizontally slidable support for the channel knife slide movable in one direction operatively to position the channel knife relatively to the edge knife and in the opposite direction to withdraw the channel knife from operative position.

45. In a machine of the class described, two vertically movable upwardly yielding slides, an edge knife carried by one of said slides, a channel knife carried by the other of said slides, a horizontally slidable support for the channel knife slide movable in one direction operatively to position the channel knife relatively to the edge knife and in the opposite direction to withdraw the channel knife from operative position, a presser foot connected to yield upwardly in unison with one of said slides, and means for connecting said slides to move vertically in unison.

46. In a machine of the class described, two vertically movable upwardly yielding slides, an edge knife carried by one of said slides, a channel knife carried by the other of said slides, a horizontally slidable support for the channel knife slide movable in one direction operatively to position the channel knife relatively to the edge knife and in the opposite direction to withdraw the channel knife from operative position, treadle operated means for moving said support, and a detachable connection between said support and said mechanism arranged to permit removal of said support and channel knife slide from the machine.

47. In a machine of the class described, two vertically movable upwardly yielding slides, an edge knife carried by one of said slides, a channel knife carried by the other of said slides, a horizontally slidable support for the channel knife slide movable toward the edge knife slide operatively to position the channel knife relatively to the edge knife and away from the edge knife slide to withdraw the channel knife from operative position, a treadle, and means operative upon depression of the treadle to move said support operatively to position the channel knife and upon further depression to raise the edge knife slide.

48. In a machine of the class described, two vertically movable upwardly yielding slides, an edge knife carried by one of said slides, a channel knife carried by the other of said slides, a horizontally slidable support for the channel knife slide movable toward the edge knife slide operatively to position the channel knife relatively to the edge knife and away from the edge knife slide to withdraw the channel knife from operative position, means for connecting said slides together, and treadle-controlled means operative upon depression of the treadle to move said support toward the edge knife slide upon further depression to raise both of said slides, and upon release of the treadle to lower said slides and move the channel knife slide away from the edge knife slide.

49. In a machine of the class described, two vertically movable upwardly yielding slides, an edge knife carried by one of said slides, a channel knife carried by the other of said slides, a horizontally slidable support for the channel knife slide, and means for moving said slide toward the edge knife slide operatively to position the channel knife and away from the edge knife slide to retract the channel knife from operative position, said means including a toggle arranged to be straightened when the channel knife is operatively positioned to lock said knife in said position.

50. In a machine of the class described, two knife supports each capable of upward and downward movement, an edge knife on one of said supports, a channel knife on the other of said supports, a presser foot connected for upward and downward movement in unison with the channel knife support, and means for rigidly connecting the two supports so that both knives are constrained to move upwardly and downwardly in unison under control of said presser foot and for disconnecting said supports so that the edge knife will not be controlled by said presser foot.

51. In a machine of the class described, two knife supports each capable of upward yielding movement, an edge knife on one of said supports, a channel knife on the other of said supports, a presser foot mounted on the edge knife support with provision for yielding movement relatively thereto, and connected to yield in unison with the channel knife support, and means for connecting the two supports so that both knives will yield in unison under control of said presser foot and for disconnecting said supports so that said edge knife will not be controlled by said presser foot.

52. In a machine of the class described, an edge knife, a channel knife, a presser foot, means for supporting each of said parts with provision for vertical movement, means adapted to force said knives downwardly, and means for connecting said knives and the presser foot to move vertically in unison and preventing relative vertical movement between the presser foot and said knives.

53. In a machine of the class described, an edge knife, a channel knife, a presser foot, means for supporting said parts with provision for vertical movement, a work support below the knives, pressure-applying means tending to force the knives downwardly toward the work support, a stop for limiting the downward movement of the edge knife, means for rigidly connecting both knives and the presser foot to gage the edge and channel cuts from the presser foot, said member being movable for the purpose of disconnecting the edge knife from the channel knife and presser foot to enable the edge cut to be gaged from the work support.

54. In a machine of the class described, a vertically movable, yieldingly mounted slide and an edge knife carried thereby, a second vertically movable, yieldingly mounted slide and a channel knife carried thereby, a vertically movable presser foot connected to move vertically in unison with the presser foot, and connections between said slides constraining them to move both upwardly and downwardly in unison under the control of said presser foot.

55. In a machine of the class described, a vertically movable, yieldingly mounted slide and an edge knife carried thereby, a second vertically movable, yieldingly mounted slide and a channel knife carried thereby, a vertically movable presser foot associated with the edge knife slide, means for supporting the channel knife slide for lateral movement toward and from the edge knife slide, means for connecting the channel knife slide to yield vertically in unison with the presser foot without interfering with the movement of the channel knife slide toward and from the presser foot, and removable means for connecting the edge knife slide with the channel knife slide.

56. In a machine of the class described, two vertically movable, upwardly yielding slides, an edge knife carried by one of said slides, a channel knife carried by the other of said slides, a horizontally slidable support for the channel knife slide movable in one direction to permit the removal of said support together with the channel knife from the machine, a vertically movable presser foot carried by the edge knife slide, a tongue-and-groove connection between said presser foot and the channel knife slide constructed and arranged to permit said parts to be disconnected upon the removal of said support from the machine, and means for frictionally supporting the presser foot in the edge knife slide while the channel knife slide and the presser foot are disconnected.

57. In a machine of the class described, two vertically movable, upwardly yielding slides, an edge knife carried by one of said slides, a channel knife carried by the other of said slides, a horizontally slidable support for the channel knife slide movable in one direction operatively to position the channel knife relatively to the edge knife and in the opposite direction to withdraw the channel knife from operative position, a presser foot having a sliding tongue-and-groove connection with the channel knife slide whereby it is constrained to yield upwardly in unison therewith, and a lock-bar for connecting said slides to move vertically in unison, said lock-bar being movable to disconnect said slides so that they may yield upwardly independently of each other.

58. In a machine of the class described, a work table capable of being raised and lowered, means adapted to co-act with said table when the latter is in raised position to feed the work, a vertically movable, upwardly yielding knife, means for reciprocating the knife in the line of feed, and means including a foot treadle adapted to raise the work table into work feeding position when the treadle is depressed to a predetermined extent and to lift the knife and presser foot when the treadle is further depressed.

59. In a machine of the class described, a work table capable of being raised and lowered, means for co-acting with the work table when the latter is in raised position to feed the work, a vertically movable, upwardly yielding edge knife, a vertically movable, upwardly yielding channel knife, a presser foot, means connecting said knives and the presser foot to move vertically in unison, means for reciprocating said parts in the line of feed, and means including a foot treadle adapted to raise the work table into work feeding position when the treadle is depressed and to lift the knives and presser foot upon further depression of the foot treadle.

60. In a machine of the class described, a work table capable of being raised and lowered, means to co-act with the table when the latter is in raised position to feed the work, two vertically yielding, upwardly moving slides, an edge knife on one slide, a channel knife on the other slide, a horizontally slidable support for the channel knife slide, an oscillating carrier for the edge knife slide and for said support, and means for raising the table into work feeding position and for sliding said support relatively to said carrier to move the channel knife into operative relation with the edge knife.

61. In a machine of the class described, a work table capable of being raised and lowered, means to co-act with the table when the latter is in raised position to feed the work, an edge knife, a channel knife movable toward and from the edge knife, and means including a treadle adapted upon depression of the treadle to raise the table into work feeding position and simultaneously to move the channel knife toward the edge knife and upon release of the treadle to lower the table and to move the channel knife away from the edge knife.

62. In a machine of the class described, a work table capable of being raised and lowered, means co-acting with the table when the latter is in raised position to feed the work, an edge knife, a channel knife movable toward the edge knife into operative relation therewith and away from the edge knife into inoperative position, driving mechanism including a clutch, and means including a foot treadle adapted upon depression of the treadle to raise the table, move the channel knife into operative relation with the edge knife, and operate the clutch to connect the driving shaft with a source of power.

63. In a machine of the class described, feeding devices reciprocating in unison at opposite sides of the work and co-operating intermittently to grip and feed the work, cutting devices comprising an edge knife and a channel knife reciprocating in unison in the line of feed, means for operating said feeding devices and said cutting devices simultaneously in opposite directions, and means for effecting relative adjustment of the edge knife and the channel knife in the line of feed.

64. In a machine of the class described, feeding devices reciprocating in unison at opposite sides of the work and co-operating intermittently to grip and feed the work, cutting devices comprising an edge knife and a channel knife reciprocating in unison in the line of feed, means for operating said feeding devices and said cutting devices simultaneously in opposite directions, and means for effecting relative adjustment of the edge knife and the channel knife in the line of feed and upon release of the treadle to lower the table, move the channel knife out of operative relation with the edge knife, and operate the clutch to disconnect the driving shaft from its source of power.

65. In a machine for preparing a sole for the subsequent operation of attaching the sole to a shoe in a welt or turn sewing machine, the combination of means for cutting along the margin at one side of a sole, and means for supporting the sole in position to be cut, said cutting means and said supporting means being relatively arranged to require feeding of the sole bodily away from the operator and turning of the sole in a clockwise direction (viewing the cut side of the sole) while the toe of the sole is being cut so that the cutting operation in the sole preparing machine proceeds relatively to the sole in the direction of the movement of the sole relatively to the channel guide in the welt or turn sewing machine.

66. In a machine for cutting one face of a sole, cutting means and feeding means constructed and arranged to operate at the right-hand side of the machine as the operator faces the machine, said means being arranged to begin their operation upon a sole on the left-hand margin only of the sole as the operator views the sole face to be cut, and said feeding means being constructed and arranged to feed the sole bodily away from the operator so as to require turning of the sole in a clockwise direction when the machine is operating on the toe.

67. In a machine for preparing a sole for the subsequent operation of a welt or turn sewing machine in the operation of which the sole is turned in a counter-clockwise direction as the sewing proceeds around the toe, the combination of cutting means arranged to begin its operation upon the sole at a point on the left-hand margin of the sole as the channeled face of the sole is viewed by the operator and feeding means constructed and arranged so to feed the sole as to require turning the sole in a clockwise direction at the toe, whereby the cutting operation upon the sole proceeds in an opposite direction to the direction of movement relatively to the sole of the channel guide of the welt or turn sewing machine in the subsequent operation of that machine.

68. In a machine of the class described, means for feeding a sole by engagement with the face of the sole, means for cutting the sole, an oscillatory carrier, a work support mounted in said carrier for sliding movement toward and from said feeding means, and means for sliding said support in one direction to move the work into position to be acted upon by said feeding and cutting means and for sliding said support in another direction to stop the feeding and cutting of the work.

69. In a machine of the class described, work feeding means, means for cutting the work, an oscillatory carrier, a work support slidably mounted in said carrier, and means including a toggle for raising said support to locate the work in position to be operated upon by said feeding and cutting means and for lowering said support to stop the feeding and cutting of the work, said toggle being arranged to lock the table in raised position.

70. In a machine of the class described, a work feeding device having an orbital movement in a vertical plane, a carrier adapted to oscillate about a horizontal axis, a work table on said carrier movable upwardly and downwardly relatively thereto, means for raising said table relatively to said carrier to position the work in the path of said feed device and for lowering said table relatively to said carrier to stop the feed of the work, and means for varying the upper limit of movement of said table.

71. In a machine of the class described, work feeding means, means for cutting the work, an oscillatory carrier, a work support slidably mounted in said carrier, an eccentric pivot stud about which said carrier is adapted to oscillate, and means for rotatably adjusting said pivot stud to vary the relation of the work support to the feeding means when the work support is in raised position.

72. In a machine of the class described, a knife for cutting the work, work feeding means in advance of the knife, a work support movable upwardly to raise the work into position to be acted upon by said feeding means and downwardly to stop the feed of the work and back and forth in other directions to enable said support to co-operate with the work feeding means to feed the work against the knife, and means for moving the work support in all of said directions.

73. In a machine of the class described, a reciprocating feed device, a work support reciprocating in unison with said feed device and capable of being raised and lowered, a reciprocating knife movable opposite to the direction of feed to cut the work while the work is being fed, and an edge gage reciprocating in unison with said knife and movable up and down in unison with said work support.

74. In a machine of the class described, a reciprocating feed device, a work support reciprocating in unison with said feed device and capable of being raised and lowered, a reciprocating knife movable opposite to the direction of feed to cut the work while the work is being fed, and an edge gage reciprocating in unison with said knife and adjustable in the plane of the work transversely with respect to the direction of feed while the machine is running to vary the width of the feather, said gage being also movable up and down in unison with said work support.

75. In a machine of the class described, work feeding means, a work support, a reciprocating knife movable opposite to the direction of feed to cut the work while the work is being fed, an edge gage reciprocating in unison with said knife and adjustable in the plane of the work transversely with respect to the direction of feed, a foot treadle, a hand lever, and means operable by either said treadle or said lever while the machine is running for adjusting the edge gage.

76. In a machine of the class described, two reciprocating carriers, a knife on one of said carriers, a feed device and a work support on the other of said carriers, said work support being movable transversely to the plane of reciprocation of the knife carrier to move the work into or out of position to be operated upon by said feed device and said knife, and an edge gage reciprocating in unison with the knife carrier and movable transversely to the plane of said reciprocation in unison with said work support.

77. In a machine of the class described, intermittently operated means for feeding the work, a knife reciprocating in the line of feed, a reciprocating work support movable with the work while the work is being advanced by said feeding means and movable also transversely to the plane of the work, and an edge gage reciprocating in unison with said knife and movable transversely to the plane of the work in unison with said work support.

78. In a machine of the class described, intermittently operated means for feeding the work, a recprocating knife movable opposite to the direction of feed to cut the work while said feeding means is feeding the work, a work support movable upwardly to raise the work into position to be acted upon by said feeding means, and downwardly to stop the feed of the work, a treadle-operated means for raising and lowering the work support, and means for oscillating the work support to enable it to co-operate with said feeding means to feed the work against the knife.

79. In a machine of the class described, a knife oscillating about a vertical axis, a work support oscillating about a horizontal axis, and capable of being raised and lowered independently of said oscillating movement, and an edge gage movable in unison with said knife and connected to be raised and lowered in unison with said work support.

80. In a machine of the class described, a reciprocating work feeding device, a knife reciprocating in the line of feed, a work table reciprocating in unison with said feeding device and adapted to be raised to support the work in position to be fed and lowered to stop the feed and facilitate the removal of the work, and an edge gage adapted to reciprocate in unison with the knife and to be raised and lowered in unison with the work table.

81. In a machine of the class described, cutting means movable in a horizontal path to and from position to operate upon the work, a work support movable to and from a position to support the work within the field of operation of the cutting means, and means for simultaneously moving the cutting means and the work support into said respective positions.

82. In a machine of the class described, cutting means movable in a horizontal path to and from position to operate upon the work, a work support movable to and from position to support the work within the field of operation of the cutting means, and means for simultaneously moving the cutting means and the work support to and from said respective positions.

83. In a machine of the class described, a reciprocating edge gage movable in and opposite to the direction of work feed, a chamfer knife carried by the edge gage, and a ledge on the edge gage for supporting the margin of the work immediately adjacent to the edge being chamfered, and a work table arranged with its upper face substantially flush with the work supporting face of said ledge and having a recess shaped to receive the ledge and to permit reciprocation of the edge gage relatively to the work table.

84. In a machine of the class described, a reciprocating work table movable in and opposite to the direction of work feed and having a recess in its upper face, an edge gage having a work supporting ledge extending into said recess, and shaped to permit reciprocation of the work table relatively to the edge gage, and a chamfer knife carried by said edge gage and arranged relatively to said ledge so that the latter will support the work at a point immediately adjacent to the edge to be chamfered.

85. In a machine of the class described, work feeding means, a reciprocating knife movable opposite to the direction of feed to cut the work, an edge gage connected to reciprocate in unison with said knife, a work supporting ledge upon the edge gage, a chamfer knife carried by the edge gage, and a work table having its upper surface recessed to receive the edge gage and to permit reciprocation of the edge gage relatively to the work table.

86. In a machine of the class described, a reciprocating work feeding device, a reciprocating work table arranged to co-operate with said device to feed the work, an edge gage, a work supporting ledge upon the edge gage, and a chamfer knife carried by the edge gage, said table having a recess in its upper face to receive said ledge and shaped and arranged to permit reciprocation of the table relatively to the edge gage.

87. In a machine of the class described, a work table, an edge gage, a reciprocating feed dog for co-operating intermittently with the work table to advance the work, and a work-engaging rib on the feed dog, said rib extending transversely of the direction of work feed and being inclined relatively to the edge gage to cause the work to hug the edge gage as it is being fed.

88. In a machine of the class described, means for cutting the work, a work table oscillating about a horizontal axis and having a cylindraceous work supporting face curved about an axis coincident with the axis of oscillation of the table, and means co-operating with said table to feed the work past the cutting means.

89. In a machine of the class described, an oscillating feed table, means co-operating with the table to feed the work a knife for cutting the work as it is fed, and a presser foot for holding the work against the table and gaging the depth of cut produced by the knife, the work table having the rear portion of its upper surface curved about the axis of ocillation of said table and the forward portion thereof curved about an axis parallel to said axis and located closer to the table.

90. In a machine of the class described, an oscillating work table, means co-operating with the table upon movement of the latter in one direction to feed the work, a reciprocating knife movable in a direction to cut the work while the work is being fed by said means and in the opposite direction to return to starting position, a reciprocating presser foot co-operating with said knife to feed the work during the cutting stroke of the knife, and means for limiting the downward movement of the presser foot, said table being shaped to support the work while the table moves in the direction of feed and to enable the presser foot to assume its lowermost position and the table thereafter to clear itself from the work while the table moves opposite to the direction of feed.

91. In a machine of the class described, an oscillating feed table, means co-operating with the table upon movement of the latter in one direction to feed the work, a knife for cutting the work as it is fed, a presser foot for holding the work against the table and gaging the depth of cut produced by the knife, and an adjustable stop for limiting the downward movement of the presser foot, the work table having its upper face shaped and arranged to enable the presser foot to assume its lowermost position and the table thereafter to clear itself from the work during the movement of the table opposite to the direction of feed.

92. In a machine of the class described, an oscillating feed table, means co-operating with the table upon its movement in one direction to feed the work, a knife for cutting the work as it is fed, a presser foot for holding the work against the table and gaging the depth of cut produced by the knife, and an adjustable stop for limiting the downwardward movement of the presser foot, the work table having a cylindraceous upper face having a radius of curvature shorter than the radius of oscillation of the table, and the axis of curvature being parallel to the axis of oscillation of the table and located so as to enable the presser foot to assume its lowermost position and the table thereafter to clear itself from the work upon movement of the table in a direction opposite to the direction of feed.

In testimony whereof I have signed my name to this specification.

ANNE W. MEYER,
*Administratrix of the Estate of William C. Meyer, deceased.*